(12) United States Patent
Ropel et al.

(10) Patent No.: US 12,188,776 B2
(45) Date of Patent: Jan. 7, 2025

(54) DYNAMIC ROUTING SYSTEM TO SELECT CHARGING STATIONS

(71) Applicant: Volvo Car Corporation, Gothenburg (SE)

(72) Inventors: Andreas Ropel, Gothenburg (SE); Ben Lloyd, Gothenburg (SE); Mathias Le Saux, Gothenburg (SE); Kostas Chatziioannou, Gothenburg (SE); Klas Persson Signell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 251 days.

(21) Appl. No.: 17/976,766

(22) Filed: Oct. 29, 2022

(65) Prior Publication Data

US 2024/0142247 A1   May 2, 2024

(51) Int. Cl.
*G01C 21/34* (2006.01)
*B60L 58/13* (2019.01)
(Continued)

(52) U.S. Cl.
CPC .......... *G01C 21/3469* (2013.01); *B60L 58/13* (2019.02); *B60L 58/16* (2019.02); *G01C 21/3446* (2013.01); *G01C 21/3492* (2013.01); *G01C 21/362* (2013.01); *G01C 21/3691* (2013.01); *G06Q 10/02* (2013.01); *B60L 2240/64* (2013.01); *B60L 2240/66* (2013.01);
(Continued)

(58) Field of Classification Search
CPC ............ G01C 21/3469; G01C 21/3446; G01C 21/3492; G01C 21/362; G01C 21/3691; G06Q 10/02; B60L 58/16; B60L 58/13
See application file for complete search history.

(56) References Cited

U.S. PATENT DOCUMENTS

| 8,751,077 B2 | 6/2014 | Hiruta et al. |
| 9,713,962 B2 | 7/2017 | Payne et al. |

(Continued)

FOREIGN PATENT DOCUMENTS

| CN | 106530180 A | 3/2017 |
| CN | 109029477 A | 12/2018 |

(Continued)

*Primary Examiner* — Seth A Silverman
(74) *Attorney, Agent, or Firm* — Davé Law Group, LLC; Raj S. Davé

(57) ABSTRACT

Embodiments relate to a dynamic routing system, comprising a memory that stores computer executable components, and a processor that executes the computer executable components stored in the memory, wherein the computer executable components comprise a first receiving component that receives information of a trip comprising a destination and departure information, and an optimal routing component that determines an optimal routing based on current conditions, user preferences for charging stations, primary user's driving habits, battery's state of health, financial impact, and availability of charging stations at the time of receiving the trip information. At the time of trip set up, the system can make reservations for charging at the charging station requiring a reservation. During the trip, if the system requires a change to the reservation, the system establishes communication with the charging station and adjusts the reservation.

20 Claims, 16 Drawing Sheets

(51) Int. Cl.
  *B60L 58/16* (2019.01)
  *G01C 21/36* (2006.01)
  *G06Q 10/02* (2012.01)

(52) U.S. Cl.
  CPC ....... *B60L 2250/16* (2013.01); *B60L 2250/18* (2013.01); *B60L 2260/54* (2013.01)

(56) References Cited

U.S. PATENT DOCUMENTS

| | | | |
|---|---|---|---|
| 10,998,753 | B2 | 5/2021 | Ambroziak et al. |
| 2014/0257895 | A1* | 9/2014 | Ball ............... G06Q 10/063112 705/7.14 |
| 2017/0307392 | A1 | 10/2017 | Kitajima et al. |
| 2018/0052000 | A1* | 2/2018 | Larner ................. G05D 1/0212 |
| 2020/0072627 | A1 | 3/2020 | Jung et al. |
| 2020/0217679 | A1 | 7/2020 | DeLuca et al. |
| 2020/0333148 | A1* | 10/2020 | Qiu .................... G01C 21/3476 |
| 2021/0023952 | A1* | 1/2021 | Sussna ................ B60L 15/2045 |
| 2021/0107372 | A1* | 4/2021 | Viswanathan .......... B60L 53/62 |
| 2021/0245618 | A1 | 8/2021 | Moegele |
| 2021/0389144 | A1* | 12/2021 | Kim ................... G01C 21/3691 |
| 2022/0136850 | A1 | 5/2022 | Takaki |
| 2022/0383432 | A1* | 12/2022 | Sakata ................. B60L 53/305 |

FOREIGN PATENT DOCUMENTS

| | | |
|---|---|---|
| CN | 110641397 A | 1/2020 |
| CN | 113253722 A | 8/2021 |
| CN | 113984079 A | 1/2022 |
| CN | 114719879 A | 7/2022 |
| WO | 2018219286 A1 | 12/2018 |
| WO | 2021235070 A1 | 11/2021 |

\* cited by examiner

| CHARGING TYPE | COMPATIBLE VEHICLE CHARGING PANEL | COMPATIBLE VEHICLE STORAGE UNITS | AVAILABLE AUTOMATION LEVEL | CHARGING SERVICE STATUS | CHARGING RATE | COST |
|---|---|---|---|---|---|---|
| STATION MANUAL | ROOF, SIDE | x, z | LOW | UP | LOW | $10 |
| STATION ROBOTIC | ROOF, SIDE | x, z | MEDIUM | DOWN | MEDIUM | $15 |
| ROADWAY | SIDE, LOWER | x, z | LOW | UP | LOW | $5 |
| OVERHEAD | ROOF | x, y | MEDIUM | UP | LOW | $20 |

FIG. 3

702 RECEIVING A FIRST INFORMATION COMPRISING A DESTINATION, A PREFERRED DRIVING HABIT, AND A CHARGING PREFERENCE FROM A DRIVER VIA AN INFOTAINMENT SYSTEM

704 DETERMINING A SHORTEST DRIVING ROUTE FROM A CURRENT POSITION TO THE DESTINATION BASED ON THE FIRST INFORMATION BY A ROUTE PLANNING SYSTEM

706 RECEIVING A SECOND INFORMATION ON ROAD CONDITION FOR THE SHORTEST DRIVING ROUTE BY THE ROUTE PLANNING SYSTEM

708 ESTIMATING A RATE OF POWER CONSUMPTION IN THE SHORTEST DRIVING ROUTE BASED ON A LENGTH OF THE SHORTEST DRIVING ROUTE, THE PREFERRED DRIVING, AND THE ROAD CONDITION, BY THE ROUTE PLANNING SYSTEM

710 UPDATING THE SHORTEST DRIVING ROUTE TO A DRIVING ROUTE COMPRISING A FIRST CHARGING STATION BASED ON THE CHARGING PREFERENCE, THE RATE OF POWER CONSUMPTION, AND AN AVAILABILITY OF THE FIRST CHARGING STATION, BY THE ROUTE PLANNING SYSTEM

FIG. 7

802 RECEIVING A FIRST INFORMATION COMPRISING A DESTINATION, A PREFERRED DRIVING HABIT, AND A CHARGING PREFERENCE FROM A DRIVER VIA AN INFOTAINMENT SYSTEM

804 DETERMINING A SHORTEST DRIVING ROUTE FROM A CURRENT POSITION TO THE DESTINATION BASED ON THE FIRST INFORMATION BY A ROUTE PLANNING SYSTEM

806 RECEIVING A SECOND INFORMATION ON ROAD CONDITION, REAL-TIME TRAFFIC DATA, AND HISTORICAL TRAFFIC DATA ANALYSED BY THE SYSTEM FOR THE SHORTEST DRIVING ROUTE

808 ESTIMATING A RATE OF POWER CONSUMPTION IN THE SHORTEST DRIVING ROUTE BASED ON A LENGTH OF THE SHORTEST DRIVING ROUTE, THE PREFERRED DRIVING, AND THE ROAD CONDITION

810 UPDATING THE SHORTEST DRIVING ROUTE TO A DRIVING ROUTE COMPRISING A FIRST CHARGING STATION BASED ON THE CHARGING PREFERENCE, THE RATE OF POWER CONSUMPTION, AND AN AVAILABILITY OF THE FIRST CHARGING STATION

812 SENDING A RESERVATION REQUEST FOR CHARGING AND AN ESTIMATED TIME OF ARRIVAL TO THE FIRST CHARGING STATION

FIG. 8

902 RECEIVING A FIRST INFORMATION COMPRISING A DESTINATION, A PREFERRED DRIVING HABIT, AND A CHARGING PREFERENCE FROM A DRIVER VIA AN INFOTAINMENT SYSTEM

904 DETERMINING A SHORTEST DRIVING ROUTE FROM A CURRENT POSITION TO THE DESTINATION BASED ON THE FIRST INFORMATION BY A ROUTE PLANNING SYSTEM

906 RECEIVING A SECOND INFORMATION ON ROAD CONDITION, REAL-TIME TRAFFIC DATA, AND HISTORICAL TRAFFIC DATA ANALYSED BY THE SYSTEM FOR THE SHORTEST DRIVING ROUTE

908 ESTIMATING A RATE OF POWER CONSUMPTION IN THE SHORTEST DRIVING ROUTE BASED ON A LENGTH OF THE SHORTEST DRIVING ROUTE, THE PREFERRED DRIVING, AND THE ROAD CONDITION

910 UPDATING THE SHORTEST DRIVING ROUTE TO A DRIVING ROUTE COMPRISING A FIRST CHARGING STATION BASED ON THE CHARGING PREFERENCE, THE RATE OF POWER CONSUMPTION, AND AN AVAILABILITY OF THE FIRST CHARGING STATION

912 SENDING A RESERVATION REQUEST FOR CHARGING AND AN ESTIMATED TIME OF ARRIVAL TO THE FIRST CHARGING STATION

914 MONITORING OF DRIVING HABIT AND DRIVING PREFERENCE BY THE SYSTEM

916 ESTIMATING A CHANGE IN THE RATE OF POWER CONSUMPTION BASED ON THE CHANGE IN THE DRIVING HABIT AND DRIVING PREFERENCE

918 DETERMINING A TIME INTERVAL WITHIN WHICH A STATE OF CHARGE OF BATTERY PACK WILL REACH A SET THRESHOLD ESTIMATED

920 UPDATING THE SHORTEST DRIVING ROUTE TO A DRIVING ROUTE COMPRISING A SECOND CHARGING STATION BASED ON ESTIMATED TIME INTERVAL WITHIN WHICH THE VEHICLE MAY REACH THE SECOND CHARGING STATION

FIG. 9

| 1002 RECEIVING A FIRST INFORMATION COMPRISING A DESTINATION, A PREFERRED DRIVING HABIT, AND A CHARGING PREFERENCE FROM A DRIVER |
|---|

↓

| 1004 DETERMINING A SHORTEST DRIVING ROUTE FROM A CURRENT POSITION TO THE DESTINATION BASED ON THE FIRST INFORMATION BY A ROUTE PLANNING SYSTEM |
|---|

↓

| 1006 RECEIVING A SECOND INFORMATION ON ROAD CONDITION, REAL-TIME TRAFFIC DATA, AND HISTORICAL TRAFFIC DATA ANALYSED BY THE SYSTEM FOR THE SHORTEST DRIVING ROUTE |
|---|

↓

| 1008 ESTIMATING A RATE OF POWER CONSUMPTION IN THE SHORTEST DRIVING ROUTE BASED ON A LENGTH OF THE SHORTEST DRIVING ROUTE, THE PREFERRED DRIVING, AND THE ROAD CONDITION |
|---|

↓

| 1010 UPDATING THE SHORTEST DRIVING ROUTE TO A DRIVING ROUTE COMPRISING A FIRST CHARGING STATION BASED ON THE CHARGING PREFERENCE, THE RATE OF POWER CONSUMPTION, AND AN AVAILABILITY OF THE FIRST CHARGING STATION |
|---|

↓

| 1012 SENDING A RESERVATION REQUEST FOR CHARGING AND AN ESTIMATED TIME OF ARRIVAL TO THE FIRST CHARGING STATION |
|---|

↓

| 1014 MONITORING OF A CHANGE DRIVING HABIT AND DRIVING PREFERENCE BY THE SYSTEM |
|---|

↓

| 1016 ESTIMATING A CHANGE IN THE RATE OF POWER CONSUMPTION BASED ON THE CHANGE IN THE DRIVING HABIT AND DRIVING PREFERENCE |
|---|

↓

| 1018 DETERMINING A TIME INTERVAL WITHIN WHICH A STATE OF CHARGE OF BATTERY PACK WILL REACH A PRE-DEFINED THRESHOLD |
|---|

↓

| 1020 UPDATING THE SHORTEST DRIVING ROUTE TO A DRIVING ROUTE COMPRISING A SECOND CHARGING STATION BASED ON ESTIMATED TIME INTERVAL WITHIN WHICH THE VEHICLE MAY REACH THE SECOND CHARGING STATION |
|---|

↓

| 1022 SENDING A RESERVATION REQUEST FOR CHARGING AND AN ESTIMATED TIME OF ARRIVAL TO THE SECOND CHARGING STATION |
|---|

FIG. 10

1102 RECEIVING A FIRST INFORMATION COMPRISING A DESTINATION, A PREFERRED DRIVING HABIT, AND A CHARGING PREFERENCE FROM A DRIVER VIA AN INFOTAINMENT SYSTEM

1104 DETERMINING A SHORTEST DRIVING ROUTE FROM A CURRENT POSITION TO THE DESTINATION BASED ON THE FIRST INFORMATION BY A ROUTE PLANNING SYSTEM

1106 RECEIVING A SECOND INFORMATION ON ROAD CONDITION, REAL-TIME TRAFFIC DATA, AND HISTORICAL TRAFFIC DATA ANALYSED BY THE SYSTEM FOR THE SHORTEST DRIVING ROUTE

1108 ESTIMATING A RATE OF POWER CONSUMPTION IN THE SHORTEST DRIVING ROUTE BASED ON A LENGTH OF THE SHORTEST DRIVING ROUTE, THE PREFERRED DRIVING, AND THE ROAD CONDITION

1110 UPDATING THE SHORTEST DRIVING ROUTE TO A DRIVING ROUTE COMPRISING A FIRST CHARGING STATION 'A' BASED ON THE CHARGING PREFERENCE, THE RATE OF POWER CONSUMPTION, AND AN AVAILABILITY OF THE FIRST CHARGING STATION

1112 SENDING A RESERVATION REQUEST FOR CHARGING AND AN ESTIMATED TIME OF ARRIVAL TO THE FIRST CHARGING STATION 'A'

1114 MONITORING OF DRIVING HABIT AND DRIVING PREFERENCE BY THE SYSTEM

1116 ESTIMATING A CHANGE IN THE RATE OF POWER CONSUMPTION BASED ON THE CHANGE IN THE DRIVING HABIT AND DRIVING PREFERENCE

1118 DETERMINING A TIME INTERVAL WITHIN WHICH A STATE OF CHARGE OF BATTERY PACK WILL REACH A SET THRESHOLD ESTIMATED

1120 UPDATING THE SHORTEST DRIVING ROUTE TO A DRIVING ROUTE COMPRISING A SECOND CHARGING STATION 'B' BASED ON ESTIMATED TIME INTERVAL WITHIN WHICH THE VEHICLE MAY REACH THE SECOND CHARGING STATION

1122 DETECTING A THIRD CHARGING STATION 'C' NEAR TO THE SECOND CHARGING 'B'

FIG. 11A

DYNAMIC ROUTING SYSTEM TO SELECT CHARGING STATIONS

FIELD OF THE INVENTION

The present application relates to a system and method for determining optimal routing with charging stations based on a planned charging scheme.

BACKGROUND

An electric vehicle (EV) comprises a battery pack, and the battery pack stores a large amount of electric energy to provide power to an automobile engine. However, due to the limited power stored in the battery pack, it is necessary to charge frequently. At present, the user has to research about charging stations and amenities available at charging stations before starting a trip. It is important to consider reachability of suitable energy supply facilities and the time for replenishing the energy for the route planning and the time planning.

Conventional methods of addressing vehicle routing under various constraints fail to provide an electric vehicle routing solution that explicitly considers uncertainty in waiting time, charging time, driving preference, driving habits and vehicle state of charge. Another disadvantage of the conventional route planning using map application is that the user has to compare and select from the charging stations around the route that the map displays. The route selected by the map can ensure that the traffic route is better, but the availability of charging stations may be sparse in the better traffic route.

Therefore, there is a long-felt need for providing an efficient method and system to optimal routing with charging stations based on a planned charging scheme that considers as many factors as possible.

SUMMARY

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

One or more embodiments described herein, present systems, vehicles, devices, computer-implemented methods, methods, apparatus, computer program products, and/or non-transitory computer readable mediums that facilitate optimal routing for an electric vehicle including an improved electric vehicle charge planning.

According to one or more embodiments, the system comprises a dynamic route planning system further comprising an infotainment system, a navigation system, a memory, and a processor, communicatively coupled to the memory, wherein the system, under power, is operable to: receive a first information comprising a destination, a preferred driving habit, and a charging preference via the infotainment system; determine a shortest driving route from a current position to the destination based on the first information; receive a second information on road condition for the shortest driving route; estimate a rate of power consumption in the shortest driving route based on a length of the shortest driving route, the preferred driving habit, and the road condition; and update the shortest driving route to a driving route comprising a first charging station based on the charging preference, the rate of power consumption, and an availability of the first charging station.

According to one or more embodiments, the vehicle comprises: a route planning system further comprising an infotainment system, a battery management system, a navigation system, a memory, and a processor, communicatively coupled to the memory, the route planning system, under power, operable to: receive a first information comprising a destination, a preferred driving habit, and a charging preference via the infotainment system; determine a shortest driving route from a current position to the destination based on the first information; receive a second information on road condition for the shortest driving route; estimate a rate of power consumption in the shortest driving route based on a length of the shortest driving route, the preferred driving habit, and the road condition; and update the shortest route to a driving route comprising a first charging station based on the charging preference, the rate of power consumption, and an availability of the first charging station.

According to one or more embodiments, the method comprises: receiving a first information comprising a destination, a preferred driving habit, and a charging preference via an infotainment system; determining a shortest driving route from a current position to the destination based on the first information by a route planning system; receiving a second information on road condition for the shortest driving route by the route planning system; estimating a rate of power consumption in the shortest driving route based on a length of the shortest driving route, the preferred driving habit, and the road condition, by the route planning system; and updating the shortest driving route to a driving route comprising a first charging station based on the charging preference, the rate of power consumption, and an availability of the first charging station, by the route planning system; and wherein the method facilitates efficient route planning that maximizes charge of a battery of a vehicle.

According to one or more embodiments, the non-transitory computer readable medium includes instructions stored thereon that when processed by at least one processor causes a system associated with a vehicle to perform operations comprising receiving a first information comprising a destination, a preferred driving habit, and a charging preference via an infotainment system; determining a shortest driving route from a current position to the destination based on the first information; receiving a second information on road condition for the shortest driving route; estimating a rate of power consumption in the shortest driving route based on a length of the shortest driving route, the preferred driving habit, and the road condition; and updating the shortest driving route to a driving route comprising a first charging station based on the charging preference, the rate of power consumption, and an availability of the first charging station.

According to one or more embodiments, the dynamic routing system comprises a memory that stores computer executable components; and a processor that executes the computer executable components stored in the memory, wherein the computer executable components comprise: a first receiving component that receives information of a trip comprising a destination and departure information; and an optimal routing component that determines an optimal routing based on a) current conditions; b) user preferences for charging stations; c) primary user's driving habits; d) battery's state of health; e) financial impact; and f) availability of charging stations at the time of receiving the trip information.

According to one or more embodiments, the system configured to: receive a software application installation package over a computer network; and install the software application onto a computing hardware associated with a vehicle; wherein the software application comprises a set of instructions executable by a computing hardware and stored in a non-transitory storage medium that, when executed, cause the computing hardware to implement operations comprising, receiving a first information comprising a destination, a preferred driving habit, and a charging preference via an infotainment system; determining a shortest driving route from a current position to the destination based on the first information; receiving a second information on road condition for the shortest driving route; estimating a rate of power consumption in the shortest driving route based on a length of the shortest driving route, the preferred driving habit, and the road condition; and updating the shortest driving route to a driving route comprising a first charging station based on the charging preference, the rate of power consumption, and an availability of the first charging station.

BRIEF DESCRIPTION OF THE FIGURES

These and other aspects of the present invention will now be described in more detail, with reference to the appended drawings showing exemplary embodiments of the present invention, in which:

FIG. 3 is a table example of charging station information exchange and update by the route planning system for intelligent charging planning and reservation, according to one or more embodiments.

FIG. 7 illustrates a flow diagram for a computer-implemented method for route planning, according to one embodiment.

FIG. 8 illustrates a flow diagram for a computer-implemented method for route planning that includes making a reservation for charging at a charging station, according to one embodiment.

FIG. 9 illustrates a flow diagram for a computer-implemented method for updating a route plan, according to one embodiment.

FIG. 10 illustrates a flow diagram for a computer-implemented method for updating a planned route to select and reserve a second charging station by the route planning system, according to one or more embodiments.

FIG. 11A and FIG. 11B illustrates a flow diagram for a computer-implemented method for a selection of a route comprising a lower cost charging station, according to one embodiment.

DETAILED DESCRIPTION

Definitions and General Techniques

Figure 1:
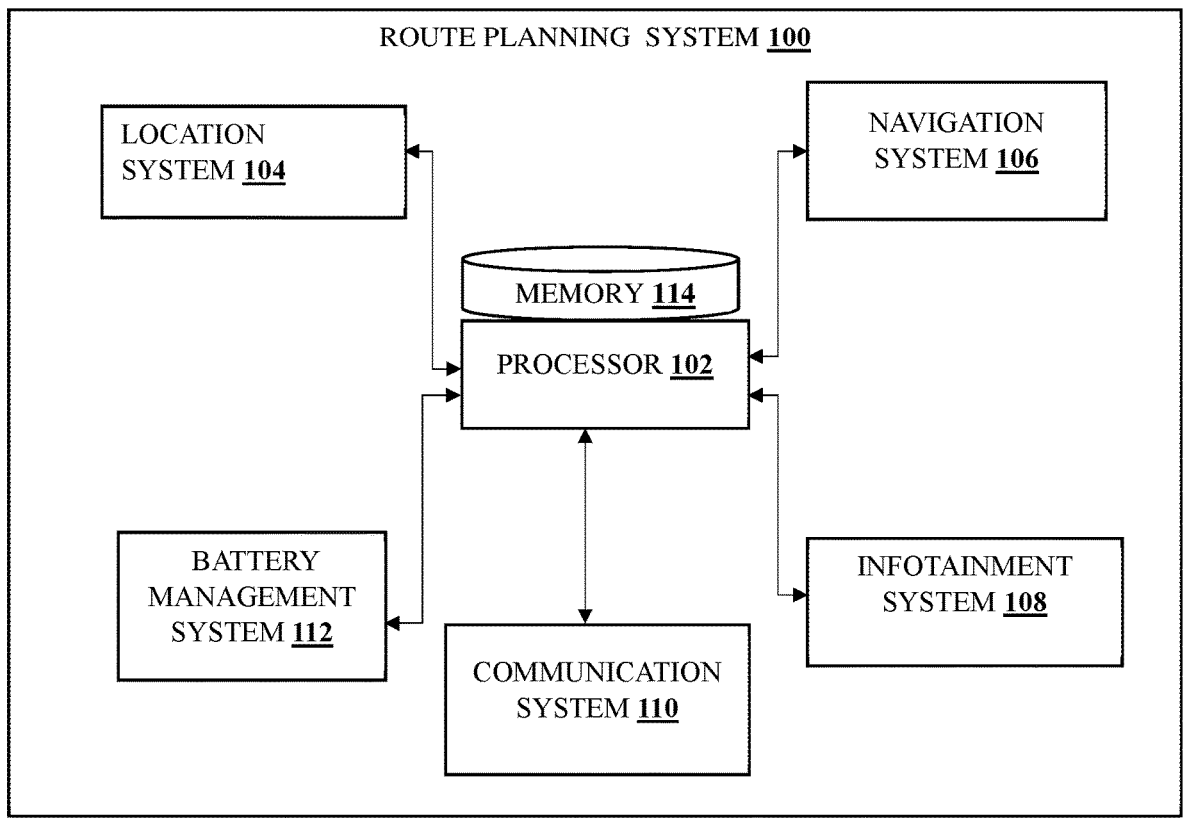
FIG. 1 is a block diagram of a route planning system for a vehicle, according to one or more embodiments.

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same elements.

Although the herein detailed description contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

The articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

The terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom" "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Other specific forms may embody the present invention without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

As used herein, the term "component" broadly construes hardware, firmware, and/or a combination of hardware, firmware, and software.

Digital electronic circuitry, or in computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EE-PROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments of the present invention may comprise or utilize a special purpose or general-purpose computer including computer hardware. Embodiments within the scope of the present invention may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

A "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general-purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. For example, the computer readable storage medium can be, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, does not construe transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein are downloadable to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter described herein is in the general context of computer-executable instructions of a computer program product that runs on a computer and/or computers, those skilled in the art will recognize that the one or more embodiments herein also can be implemented in combination with one or more other program modules. Program modules include routines, programs, components, data structures, and/or the like that perform particular tasks and/or implement particular abstract data types. Moreover, other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like can practice the herein described computer-implemented methods. Distributed computing environments, in which remote processing devices linked through a communications network perform tasks, can also practice the illustrated aspects. However, stand-alone computers can practice one or more, if not all aspects of the one or more embodiments described herein. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

As it is employed in the subject specification, the term "processor" can refer to any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A combination of computing processing units can implement a processor.

Herein, terms such as "store," "storage," "data store," data storage," "database," and any other information storage component relevant to operation and functionality of a component refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random-access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein include, without being limited to including, these and/or any other suitable types of memory.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

The following terms and phrases, unless otherwise indicated, shall be understood to have the following meanings.

The term "vehicle" as used herein refers to a thing used for transporting people or goods such as an automobile car, truck, or bus.

The term "electric vehicle (EV)" as used herein refers to a vehicle, powered by an electric motor that draws current from an on-vehicle energy storage device, such as a battery, which is rechargeable from an off-vehicle source, such as residential or public electric service or an on-vehicle fuel powered generator. The EV may be two or more wheeled vehicles manufactured for use primarily on public streets, roads. The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

The term "plug-in electric vehicle (PEV)" as used herein refers to an Electric Vehicle that recharges the on-vehicle primary battery by connecting to the power grid.

The term "plug-in vehicle (PV)" as used herein refers to an electric vehicle rechargeable through wireless charging from an electric vehicle supply equipment (EVSE) without using a physical plug or a physical socket.

The term "heavy duty vehicle (HD Vehicle)" as used herein refers to any four- or more wheeled vehicle as defined in 49 CFR 523.6 or 49 CFR 37.3 (bus).

The term "light duty plug-in electric vehicle" as used herein refers to a three or four-wheeled vehicle propelled by an electric motor drawing current from a rechargeable storage battery or other energy devices for use primarily on public streets, roads and highways and rated at less than 4, 545 kg gross vehicle weight.

The term "autonomous mode" as used herein refers to an operating mode which is independent and unsupervised.

The term "autonomous vehicle" also referred to as self-driving vehicle, driverless vehicle, robotic vehicle as used herein refers to a vehicle incorporating vehicular automation, that is, a ground vehicle that can sense its environment and move safely with little or no human input. Self-driving vehicles combine a variety of sensors to perceive their surroundings, such as thermographic cameras, Radio Detection and Ranging (radar), Light Detection and Ranging (lidar), Sound Navigation and Ranging (sonar), Global Positioning System (GPS), odometry and inertial measurement unit. Control systems, designed for the purpose, interpret sensor information to identify appropriate navigation paths, as well as obstacles and relevant signage.

The term "artificial intelligence module" refers to any system that perceives its environment and takes actions that maximize its chance of achieving its goals. Artificial intelligence unit utilizes a plurality of Machine learning algorithms that allow systems to automatically improve through experience.

As used herein "Machine learning" refers to algorithms that give a computer the ability to learn without explicit programming, including algorithms that learn from and make predictions about data. Machine learning algorithms include, but are not limited to, decision tree learning, artificial neural networks (ANN) (also referred to herein as a "neural net"), deep learning neural network, support vector machines, rule-based machine learning, random forest, etc. For the purposes of clarity, algorithms such as linear regression or logistic regression can be part of a machine learning process. However, using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may feature a feedback loop to adjust the system output dynamically as it learns from the new data as it becomes available. In machine learning, backpropagation and feedback loops train the AI/ML model improving the model's accuracy and performance over time. Statistical modeling relies on finding relationships between variables (e.g., mathematical equations) to predict an outcome.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is a datum.

The term "energy source" as used herein refers to the electrical and mechanical equipment and their interconnections necessary to generate or convert power.

The term "AC" as used herein refers to alternating current.

The term "DC" as used herein refers to direct current.

The term "wired connection" as used herein refers to a connection using physical cables to connect between the devices.

The term "wireless connection" as used herein refers to electrical connection between two or more points that do not use an electrical conductor as a medium.

The term "power grid" as used herein refers to a network, usually of a power company, for transmitting and distributing electric power.

The term "circuit" as used herein refers to an arrangement of interconnected components that has at least one input and one output terminal, and whose purpose is to produce at the output terminals a signal that is a function of the signal at the input terminals.

The term "control unit" or "control module" or "electronic control unit" refers to a functional unit in a computer system that controls one or more units of the peripheral equipment. For example, it may be a component of a charging system that provides instructions or signals to the charger unit to charge the battery pack as per the charging requirement.

The term "battery pack" as used herein refers to a set of any number of identical batteries or individual cells of a battery. The "battery pack" may also refer to a set of non-identical batteries. The configuration of batteries in the battery pack may be in series, parallel or a combination of both to deliver the desired voltage, capacity, and/or power density.

The term "charging station" as used herein refers to a device that includes at least one docking terminal with a charger for charging a battery pack. The term "charging station" as used herein further refers to an apparatus that can function as a source of power for charging the battery pack of an electric vehicle including facilitating data communications between the electric vehicle and the charging station. The communications may be through a wired connection or a wireless connection. The charging station is also capable of charging the electric vehicle either through a wired connection or a wireless connection.

The term "charging system" as used refers to an apparatus in an electric vehicle that is capable of receiving power from a charging station and charging the battery pack. The charging system is capable of monitoring and controlling the battery pack. The charging system is also capable of calculating and monitoring battery parameters (e.g., battery impedance, battery resistance, battery temperature, state-of-charge, state-of-health, etc.). The charging system is communicatively coupled to a vehicle computer system. The charging system is also communicatively coupled to the charging station.

The term "route planning" or "routing" refers to the process of computing the effective method of transportation or transfers through several stops. Route planning ascertains which route is the most cost-effective when moving from one place to another. It also includes route optimization.

The term "route optimization" refers to the process of evaluating the potential combination of options and constraints to produce a route plan that makes the most effective use of the fleet resources. Today, the route planning process involves using route optimization technology because of its ability to determine the most effective route plan more extensively and quickly. Route optimization technology employs algorithms and other techniques such as artificial intelligence or machine learning to create the best results.

The term "vehicle computer system" refers to an embedded system in automotive electronics that controls one or more of the electrical systems or subsystems in a vehicle or other motor vehicle. The computer executes a large number of different software functions in the powertrain, chassis, driver assistance, and infotainment domains, etc. on separate control units. The vehicle computer system may be communicatively coupled with an external device of a user. The vehicle computer system may also be communicatively coupled with the charging station.

The term "infotainment system" or "in-vehicle infotainment system" (IVI) as used herein refers to a combination of vehicle systems that deliver entertainment and information to the driver and the passengers/occupants through audio/video interfaces, control elements like touch screen displays, button panel, voice commands, and more. Some of the main components of an in-vehicle infotainment systems are an integrated head-unit, a heads-up display, high-end Digital Signal Processors (DSPs), and Graphics Processing Units (GPUs) to support multiple displays, operating systems, Controller Area Network (CAN), Low-Voltage Differential Signaling (LVDS), and other network protocol support (as per the requirement), connectivity modules, automotive sensors integration, digital instrument cluster, etc.

The term "maximum charging" or "optimally charging" as used refers to a maximum charging rate of the battery pack during the charging time without damaging the battery pack.

The term "charging time" as used herein refers to a time allotted for charging. The user may provide the charging time. The charging station or the charging system may also determine the charging time. The charging time may be split into charging time segments. Each charging time segment may correspond to a different charging level. Each charging time segment may correspond to charging the different portion of the battery pack.

The term "state-of-health (SoH)" refers to a figure of merit of the condition of a battery pack, compared to its ideal conditions. The state-of-health (SoH) of a battery pack describes the difference between a battery pack being studied and a fresh battery pack and considers cell aging. The SoH is the ratio of the maximum battery charge to its rated capacity. The SoH is represented in percentage form.

The term "state-of-charge (SoC)" refers to the level of charge of an electric battery relative to its capacity. The units of SoC are percentage points (0%=empty; 100%=full). An alternative form of the same measure is the depth of discharge (DoD), the inverse of SoC (100%=empty; 0%=full). SoC is normally used when discussing the current state of a battery in use, while DoD is most often seen when discussing the lifetime of the battery after repeated use.

The term "level 1 charging" refers to a charge that uses 120-207 Volts. Every electric vehicle or plug-in hybrid can be charged on level 1 charging by plugging the charging equipment into a regular wall outlet. Level 1 charging may be the slowest way to charge an EV. Level 1 charging generally adds between 3 and 5 miles of range per hour.

The term "level 2 charging" refers to a charge that uses 208-240 Volts. Level 2 charging is most commonly used for daily EV charging. Level 2 charging equipment can be installed at home, at the workplace, as well as in public locations like shopping plazas, train stations and other destinations. Level 2 charging can replenish between 12 and 80 miles of range per hour, depending on the power output of the Level 2 charger, and the vehicle's maximum charge rate.

The term "level 3 charging" refers to a charge that uses 400-900 Volts DC. Level 3 charging is the fastest type of charging available and can recharge the EV at a rate of 3 to 20 miles of range per minute. Unlike Level 1 charging and Level 2 charging that uses alternating current (AC), Level 3 charging uses direct current (DC).

The term "rate of power consumption" as used herein refers to the power consumption rate of the vehicle. It comprises the rate of power consumption by the vehicle for covering a distance as well as the rate of power consumption by the auxiliary devices of the vehicle.

The term "user" as used herein includes a primary driver, a secondary driver and/or passenger of a vehicle.

As used herein the term "driving habit" or "preferred driving habit" refers to a speed preference, a route preference, a preference for an amount of manual driving operation, a preference for an amount of automatic driving operation, and a preferred driving mode preferred by the user.

The term "communication" as used herein refers to the transmission of information and/or data from one point to another by means of electromagnetic waves. It is also a flow of information from one point, known as the source, to another, the receiver. Communication comprises one of the following: transmitting data, instructions, and information or a combination of data, instructions, and information. Communication happens between any two communication systems or communicating units. The term "in communication with" may refer to any coupling, connection, or interaction using electrical signals to exchange information or data, using any system, hardware, software, protocol, or format, regardless of whether the exchange occurs wirelessly or over a wired connection. The term communication includes systems that combine other more specific types of communication, such as V2I (Vehicle-to-Infrastructure), V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid) and Vehicle-to-Everything (V2X) communication. V2X communication is the transmission of information from a vehicle to any entity that may affect the vehicle, and vice versa. The main motivations for developing V2X are occupant safety, road safety, traffic efficiency and energy efficiency. Depending on the underlying technology employed, there are two types of V2X communication technologies: cellular networks and other technologies that support direct device-to-device communication (such as Dedicated Short-Range Communication (DSRC), Port Community System (PCS), Bluetooth®, Wi-Fi® etc.). Further, the emergency communication apparatus is configured on a computer with the communication function and is connected for bidirectional communication with the on-vehicle emergency report apparatus by a communication line through a radio station and a communication network such as a public telephone network or by satellite communication through a communication satellite. The emergency communication apparatus is adapted to communicate, through the communication network, with communication terminals including a road management office, a police station, a fire department, and a hospital. The emergency communication apparatus can be also connected online with the communication terminals of the persons concerned, associated with the occupant (the user receiving the service) of the emergency-reporting vehicle.

The term "communication system" or "communication module" as used herein refers to a system which enables the information exchange between two points. The process of transmission and reception of information is communication. The major elements of communication include but are not limited to a transmitter of information, channel or medium of communication and a receiver of information.

The term "connection" as used herein refers to a communication link. It refers to a communication channel that connects two or more devices for the purpose of data transmission. It may refer to a physical transmission medium such as a wire, or to a logical connection over a multiplexed medium such as a radio channel in telecommunications and computer networking. A channel transfers information, for example a digital bit stream, from one or several senders to one or several receivers. A channel has a certain capacity for transmitting information, often measured by its bandwidth in Hertz (Hz) or its data rate in bits per second. For example, a Vehicle-to-Vehicle (V2V) communication may wirelessly exchange information about the speed, location and heading of surrounding vehicles.

The term "bidirectional communication" as used herein refers to an exchange of data between vehicles and an infrastructure that is enabled by a system of hardware, software, and firmware. This communication is typically wireless.

As referred herein, "vehicle-to-device communication" or "V2D" communication is a particular type of vehicular communication system that consists of exchange of information between a vehicle and any electronic device that may be connected to the vehicle itself. allows vehicles to exchange information with any smart device, usually via Bluetooth protocol.

As referred herein, "vehicle-to-grid communication" or "V2G," also known as Vehicle-to-home (V2H) or Vehicle-to-load (V2L) describes a system in which plug-in electric vehicles (PEV) sell demand response services to the grid communication. It is a member of the V2X group of technologies that provides bidirectional data exchange between plug-in hybrid vehicles (PHEV), battery electric vehicles (BEV), and even hydrogen fuel cell vehicles (HFCEV) with the smart grid in support of electrification of transport. This communication facilitates balance loads more efficiently as well as reduce utility bill costs.

Some embodiments of the electric vehicle intelligent charge planning and reservation techniques of the present application are herein described with reference to the accompanying drawings.

The present application relates to providing an intelligent charge planning scheme for electric vehicles. The specification describes one or more aspects of an improved electric vehicle charge planning and scheduling technique in which information on the electric vehicle side, the navigation side, and the charging side is considered by a route planning system, thereby enabling a more reliable and efficient charging scheme to be planned for the electric vehicle. The vehicles referred to herein includes a pure electric vehicle driven by a motor, a plug-in hybrid vehicle driven by a motor and an engine simultaneously or individually, and the like. The motor runs on electric power supplied from a vehicle battery, and thus it is necessary to charge the vehicle battery after it has been consumed to some extent. At present, an electric vehicle is generally charged via a public charging device, a cell charging device, or a household charging device, or the like. Many vehicle enterprises have built or are about to build their own charging station networks, and many third-party charging operators provide the charging station networks. Traveling via electric vehicle consumes considerable travel time due to associated vehicle charging time and waiting time at a charging station. If the electric vehicle arrives at the charging station and finds that the charging station cannot provide the charging service for several reasons, the driver has to turn to another charging station, and the travel time is further increased. The application is based on the recognition of an optimum driving route and an optimum charging route scheme to provide reliable charge planning suggestions for the user.

In an embodiment, a dynamic routing system is provided that receives information of a trip from the user, determines optimal routing (e.g., identifying one or more charging stations for efficient routing that maximizes battery charge) based on a) current conditions (e.g., weather, traffic, road etc.); b) user preferences for charging stations (e.g., standard stations or preferred stations); c) primary user's driving habits; and battery's state of health; d) financial impact; and e) availability of charging stations at the time of receiving trip information. During the trip, the system continuously monitors all of the above factors, including changes in driving habits of a primary user or if another user with known habits is driving the vehicle and adjusts selection of the charging stations. At the time of trip setup, the system can make reservations for charging where a reservation is required. During the trip, if change to reservation is required, the system establishes communication and adjusts the reservation. This can occur when the state of battery charging has changed due to environmental conditions or driving habits of the user.

According to one or more embodiments, a system comprises a dynamic route planning system further comprising an infotainment system, a navigation system, a memory, and a processor, communicatively coupled to the memory, wherein the system, under power, is operable to: receive a first information comprising a destination, a preferred driving habit, and a charging preference via the infotainment system; determine a shortest driving route from a current position to the destination based on the first information; receive a second information on road condition for the shortest driving route; estimate a rate of power consumption in the shortest driving route based on a length of the shortest driving route, the preferred driving habit, and the road condition; and update the shortest driving route to a driving route comprising a first charging station based on the charging preference, the rate of power consumption, and an availability of the first charging station.

In an embodiment, the system further comprises a battery management system that is operable to estimate a state of charge of a battery, a state of health of the battery, and the rate of power consumption. In another embodiment, the system further comprises a location system that can provide a current location of a vehicle comprising the battery.

FIG. 1 is a block diagram of the route planning system for a vehicle, according to one or more embodiments. The route planning system 100 comprises a location system 104, a navigation system 106, a battery management system 112, an infotainment system 108, a memory 114 and a processor 102. The location system 104 provides a current location of the vehicle. The navigation system 106 provides all the routes connecting a current location with the destination input by the system. The navigation system 106 also provides information of existing charging stations in all the routes connecting the current location with the destination input by the system. The battery management system 112 provides a state of charge of the battery in the vehicle. The battery management system 112 also provides a rate of power consumption based on the driving habit of the user, a preferred driving mode, a road condition, and a state of health of the battery. The user can interact with the route planning system via the infotainment system 108. The communication system 110 facilitates communication with the charging stations. The processor 102 and the memory 114, when provided with power and instructed for execution of route planning, helps in execution of route planning steps to arrive at an optimum route with a charging station in case the system predicts a low state of charge. The infotainment system is configured to facilitate a continuous communication with the user.

The route planning system is communicatively connected to a navigation system for the vehicle, thereby transmitting and receiving information to and from the navigation system. In this way, the route planning system can acquire map information related to the vehicle route. In an embodiment, the route planning system may use an external navigation system as a main navigation system for the route planning.

In an embodiment, the system is further operable to transmit a first charging reservation request, the current location, and a first estimated time of arrival to the first charging station based on a confirmation of a user.

In an embodiment, the system is further operable to: monitor a driving habit and a driving preference; estimate a change in the rate of power consumption of the battery based on the change in the driving habit, the driving preference, and the road condition; estimate a time interval within which a state of charge will reach a set threshold; and update the driving route to include a second charging station where the vehicle can reach within the time interval. In another embodiment, the system is further operable to transmit a second charging reservation request and a second estimated time of arrival to a second available charging station based on confirmation of the user. In another embodiment, the system is further operable to transmit a cancellation request to the first charging station based on confirmation of the user.

In an embodiment, a second information on road condition is received via at least one of a navigation system, the vehicle, and the user.

In another embodiment, the preferred driving habit comprises a preferred driving mode.

In another embodiment, the preferred driving mode is one of an economy mode, a comfort mode, a sport mode, a race mode, and an off-road drive mode.

In another embodiment, the road condition comprises road surface condition, road anomalies and weather conditions.

In an embodiment, the system is further operable to estimate a wait time at the first charging station and the second charging station. In another embodiment, the system is further operable to estimate a charging time at the first charging station and the second charging station. In another embodiment, the driving route is an optimal planned route based on an estimated wait time and an estimated charging time of the vehicle at the first charging station. In yet another embodiment, the driving route is further determined based on an estimated charging time. In another embodiment, the driving route is further determined based on real time and historical traffic data. In another embodiment, the system is further configured to receive real-time traffic updates for dynamic route planning.

Figure 2:
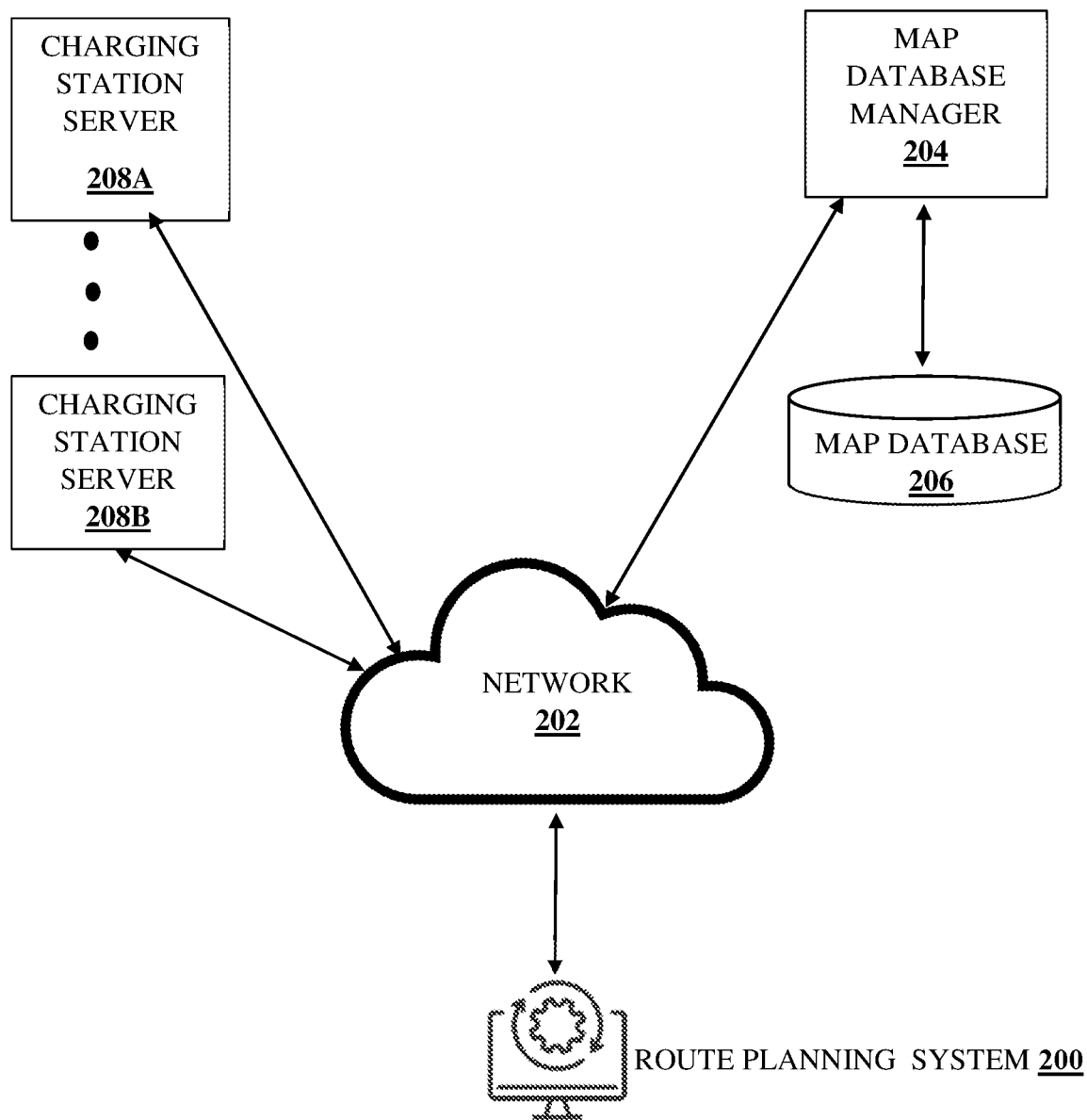
FIG. 2 is a representation of a route planning system interacting with a map database and charging station, according to one or more embodiments.

FIG. 2 is a schematic representation of a route planning system interacting with a charging map database and a charging station, according to one or more embodiments.

In an embodiment, the route planning system 200 interacts with a map database manager 204 to provide all the available charging stations in a selected route. The route planning system 200 connects to the map database 206 via the network 202. The route planning system 200 can also establish a bidirectional communication with the charging station servers (208A, 208B, etc.) that are available in the planned route.

FIG. 3 is a charging station table for intelligent charging planning and reservation, according to one or more embodiments. In an embodiment, the information communicated between the charging station and the route planning system may comprise a charging type, a compatible charging panel, compatible vehicle storage units, available automation level, charging service status and the charging cost.

According to one or more embodiments, a vehicle comprises: a route planning system further comprising an infotainment system, a battery management system, a navigation system, a memory, and a processor, communicatively coupled to the memory, the route planning system, under power, operable to: receive a first information comprising a destination, a preferred driving habit, and a charging preference via the infotainment system; determine a shortest driving route from a current position to the destination based on the first information; receive a second information on road condition for the shortest driving route; estimate a rate of power consumption in the shortest driving route based on a length of the shortest driving route, the preferred driving habit, and the road condition; and update the shortest route to a driving route comprising a first charging station based on the charging preference, the rate of power consumption, and an availability of the first charging station.

In an embodiment, the vehicle receives a charge via at least one of a charging means comprising an emergency charging vehicle system, an aerial vehicle charging system, a roadway system, a robotic charging system, and overhead charging system.

In another embodiment, the vehicle engages with elements within the vehicle comprising vehicle driver, vehicle passengers, and vehicle database. In another embodiment, the vehicle database is remotely located. In another embodiment, the vehicle database resides physically in the vehicle. In another embodiment, the vehicle operates autonomously. In another embodiment, the vehicle operates semi-autonomously in an autonomous environment. In another embodiment, the vehicle engages with a remote operator system, which may provide routing instructions and control.

Figure 4A:
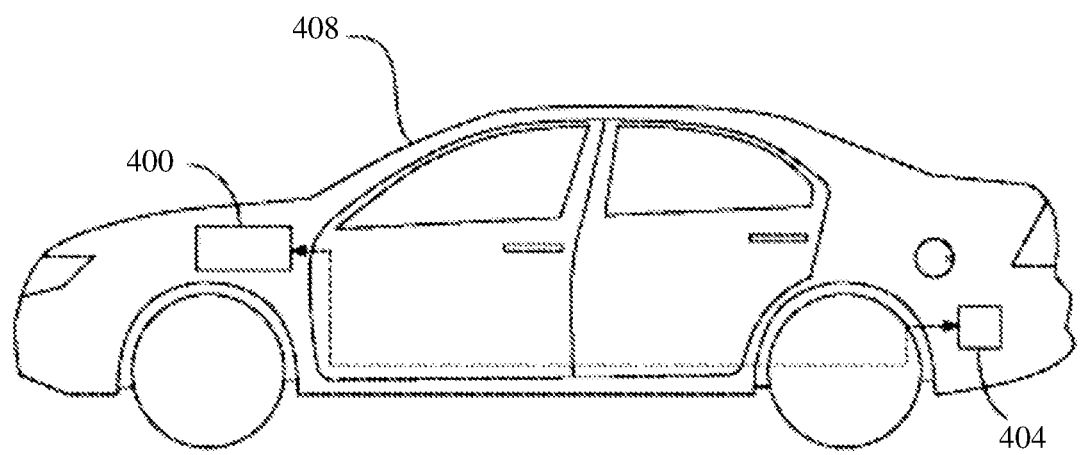
FIG. 4A is a diagram of a vehicle comprising a route planning system, according to one or more embodiments.

FIG. 4A is a schematic diagram of a vehicle comprising a route planning system, according to one or more embodiments. The vehicle comprises a route planning system 400, an infotainment system 408, a charging port 404, and a location system.

Figure 4B:
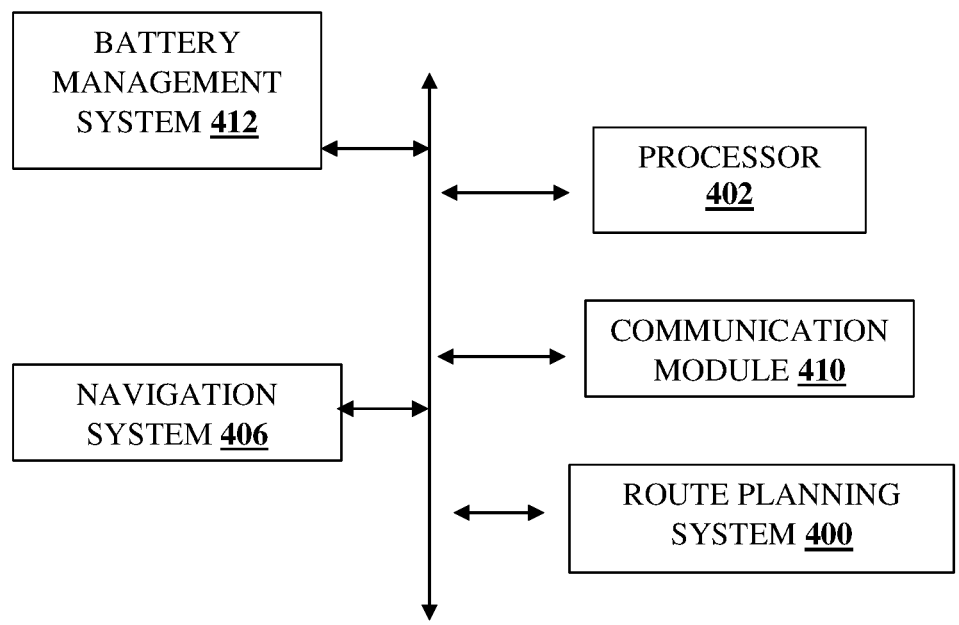
FIG. 4B is a diagram of information flow between the components of the vehicle comprising a route planning system, according to one or more embodiments.

FIG. 4B is a diagram of information flow between the components of the vehicle comprising a route planning system, according to one or more embodiments. There is a bidirectional flow of information and instruction between the battery management system 412, navigation system 406, route planning system 400, communication module 410 and processor 402.

In an embodiment, the infotainment system is configured to facilitate continuous communication with the user. In another embodiment, the system is configured to receive a route change by the user. In another embodiment, the infotainment system is configured to receive a charging station change by the user.

In another embodiment, the infotainment system is operable to display the driving route.

In an embodiment, the infotainment system receives information via an external device. In another embodiment, the external device is a handheld device. In yet another embodiment, the external device is a rear-seat user display. In an embodiment, the external device is remotely located. In another embodiment, the external device is operable to display the driving route. In an embodiment, the first information is received via an external device. In another embodiment, the external device is a handheld device. In another embodiment, the handheld device is one of a laptop, a mobile phone, a tablet, and a rear-seat user display.

Figure 5:
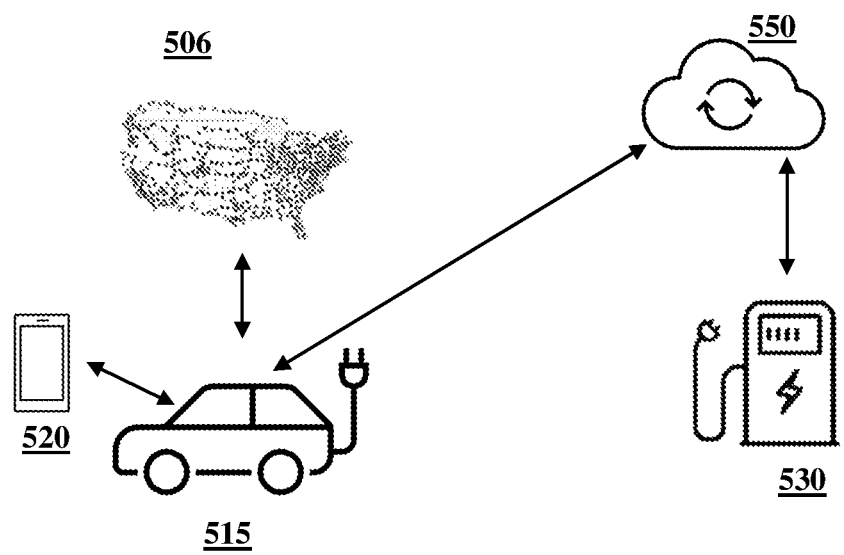
FIG. 5 is a diagram of information exchange with external devices by the vehicle for intelligent charging planning and reservation, according to one or more embodiments.

FIG. 5 is a schematic diagram of information exchange with external devices by the vehicle for intelligent charging planning and reservation, according to one or more embodiments. The vehicle 515 obtains the charging station distribution map 506 from a database and obtains the charging preference by user's input via an external device 520 (for example a mobile phone). The system then selects the charging stations 530 that are situated in the planned route as well as those that are near the planned route up to a set distance from the planned route and sends an enquiry of availability status via the internet. After the charging stations send availability status, the vehicle sends an enquiry for information comprising an available charging type, an available compatible charging panel, available automation level, and the charging cost. Based on the information received from the charging stations, the vehicle (the system processor) sends a reservation request to the appropriate charging station/s with the estimated arrival time.

In an embodiment, a driver (or passenger) has a smartphone (or other smart device, such as iPad, etc.) with an associated application installed, which drives an electric vehicle. The user may communicate wirelessly with the remote communication network 550 via the smartphone. Optionally, the vehicle has a wireless interconnection system capable of wireless communication with the remote communication network; for this purpose, a human-machine interface, for example an input/output interface of a vehicle navigation system, is provided in the vehicle. Further alternatively, the smartphone of the user can be interconnected with the wireless interconnection system of the vehicle in a wired or wireless manner.

In an embodiment, the infotainment system communicates with the external device via a companion app installed in the external device.

Figure 6:
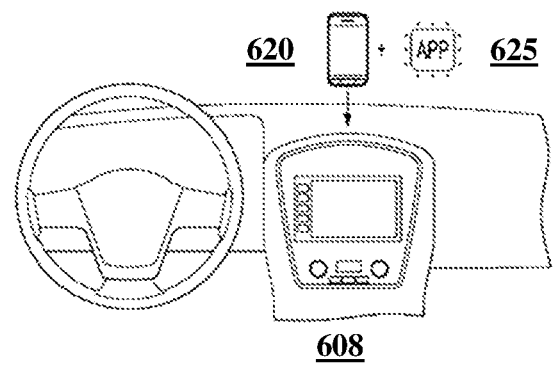
FIG. 6 is a diagram of interaction between the infotainment system of the vehicle and an external device via an app for intelligent charging planning and reservation, according to one or more embodiments.

FIG. 6 is a schematic diagram of interaction between the infotainment system of the vehicle 608 and an external device 620 via an app 625 for intelligent charging planning and reservation, according to one or more embodiments. In an embodiment the infotainment system of the vehicle communicates with the user through an external device via an app. The app can be easily installed on the phone. The inputs provided by the user in the app are reflected on the infotainment system. The route planning system can then use data inputs by the user via the infotainment system.

In yet another aspect, a method is described herein. The method comprises: receiving a first information comprising a destination, a preferred driving habit, and a charging preference from a user via an infotainment system; determining a shortest driving route from a current position to the destination based on the first information by a route planning system; receiving a second information on road condition for the shortest driving route by the route planning system; estimating a rate of power consumption in the shortest driving route based on a length of the shortest driving route, the preferred driving habit, and the road condition, by the route planning system; and updating the shortest driving route to a driving route comprising a first charging station based on the charging preference, the rate of power consumption, and an availability of the first charging station, by the route planning system; and wherein the method facilitates efficient route planning that maximizes charge of a battery of a vehicle.

In an embodiment, the route planning system receives the first information via an external device. In another embodiment, the external device is a handheld device. In another embodiment, the handheld device is one of a laptop, a mobile phone, a tablet, and a rear-seat user display. In another embodiment, the route planning system receives the second information on road condition via at least one of a navigation system, the vehicle, and the driver. In another embodiment, the preferred driving habit comprises a speed preference, a route preference, a preference for an amount of manual driving operation, a preference for an amount of automatic driving operation, and a preferred driving mode. In another embodiment, the preferred driving mode is one of an economy mode, a comfort mode, a sport mode, a race mode, and an Off-road drive mode.

In an embodiment, the planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

In an embodiment, the method further comprises transmitting a first charging reservation request, a current location, and a first estimated time of arrival to a first charging station based on confirmation of the driver. In yet another embodiment, the method further comprises monitoring a driving habit; estimating a change in the power consumption of the battery based on the change in the driving habit and the road condition; estimating a time interval within which a state of charge will reach a set threshold; and updating the driving route to include a second charging station where the vehicle can reach within the time interval. In yet another embodiment, the method further comprises transmitting a second charging reservation request and a second estimated time of arrival to a second available charging station based on a confirmation by the driver. In yet another embodiment, the method further comprises transmitting a cancellation request to the first charging station based on the confirmation by the driver. In yet another embodiment, the method further comprises updating the shortest driving route to include a third charging station in which cost of electrical energy is less than the first charging station and the second charging station. In yet another embodiment, the method further comprises estimating a wait time at the first charging station and the second charging station. In yet another embodiment, the method further comprises estimating a charging time at the first charging station and the second charging station. In yet another embodiment, the method the driving route is an optimal planned route based on an estimated wait time and an estimated charging time of the vehicle at the first charging station. In yet another embodiment, the estimated charging time method is based on an estimated charge level at an estimated time of arrival at the charging station. In yet another embodiment, the method further comprises determining that the battery should be charged to an upper state of charge limit at the first charging station and second charging station when the cost of electrical energy at the first charging station is the same as and less than the cost of electrical energy at the third charging station. In yet another embodiment, the method further comprises determining that the battery should be charged at the first charging station and second charging station with sufficient electrical energy to reach the third charging station plus a margin of electrical energy when the cost of electrical energy at the first charging station and second charging station is less than the cost of electrical energy at the second charging station. In yet another embodiment, the method further comprises determining that the battery should not be charged at the first charging station when the battery has a sufficient state of charge to power the vehicle to the second charging station from a current location and the cost of electrical energy is less at the second charging station than at the first charging station. In yet another embodiment, the method further comprises receiving real-time traffic updates for dynamic route planning.

In an embodiment, route planning uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

FIG. 7 illustrates a flow diagram for a computer-implemented method 700 for route planning, according to one embodiment.

At 702, the computer-implemented method 700 can comprise: receiving a first information comprising a destination, a preferred driving habit, and a charging preference from a driver via an infotainment system or an external device. The external device can be a handheld device. The non-limiting examples of the external device are a laptop, a mobile phone, a tablet, and a rear-seat user for an amount of manual driving operation, a preference for an amount of automatic driving operation, and a preferred driving mode. The preferred driving mode can be one of an economy mode, a comfort mode, a sport mode, a race mode, and an Off-road drive mode. The charging preference comprises one of Level 1 charging, Level 2 charging, and Level 3 charging. The charging station is selected based on the charging preference.

At 704, the method 700 can further comprise determining a shortest driving route from a current position to the destination based on the first information. The planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

At 706, the method 700 can further comprise receiving a second information on road condition for the shortest driving route by the route planning system. The second information on road condition is received via at least one of a navigation system, the vehicle, and the driver.

At 708, the method 700 can further comprise estimating a rate of power consumption in the shortest driving route based on a length of the shortest driving route, the preferred driving habit, and the road condition, by the route planning system. The route planning system also considers the energy that is required at the wheels to propel the vehicle, the energy losses along the powertrain, and the energy that is required for the operation of the auxiliary devices for estimating the rate of power consumption.

At 710, the method 700 can further comprise updating the shortest driving route to a driving route comprising a first charging station based on the charging preference, the rate of power consumption, and an availability of the first charging station, by the route planning system. The driving route is an optimal planned route based on an estimated wait time and an estimated charging time of the vehicle at the first charging station. The estimated charging time is based on an estimated charge level at an estimated time of arrival at the charging station.

FIG. 8 illustrates a flow diagram for a computer-implemented method 800 for route planning that includes making a reservation for charging at a charging station, according to one embodiment.

At 802, the computer-implemented method 800 can comprise: receiving a first information comprising a destination, a preferred driving habit, and a charging preference from a driver via an infotainment system or an external device. The external device can be a handheld device. The non-limiting examples of the external device are a laptop, a mobile phone, a tablet, and a rear-seat user for an amount of manual driving operation, a preference for an amount of automatic driving operation, and a preferred driving mode. The preferred driving mode can be one of an economy mode, a comfort mode, a sport mode, a race mode, and an Off-road drive mode. The charging preference comprises one of Level 1 charging, Level 2 charging, and Level 3 charging. The charging station is selected based on the charging preference.

At 804, the method 800 can further comprise determining a shortest driving route from a current position to the destination based on the first information. The planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

At 806, the method 800 can further comprise receiving a second information on road condition, real-time traffic data, and historical traffic data analyzed by the system for the shortest driving route by the route planning system. The second information on road condition is received via at least one of a navigation system, the vehicle, and the driver.

At 808, the method 800 can further comprise estimating a rate of power consumption in the shortest driving route based on a length of the shortest driving route, the preferred driving habit, and the road condition, by the route planning system. The route planning system also considers the energy that is required at the wheels to propel the vehicle, the energy losses along the powertrain, and the energy that is required for the operation of the auxiliary devices for estimating the rate of power consumption.

At 810, the method 800 can further comprise updating the shortest driving route to a driving route comprising a first charging station based on the charging preference, the rate of power consumption, and an availability of the first charging station, by the route planning system. The driving route is an optimal planned route based on an estimated wait time and an estimated charging time of the vehicle at the first charging station. The estimated charging time is based on an estimated charge level at an estimated time of arrival at the charging station.

At 812, the method 800 can further comprise sending a reservation request for charging and an estimated time of arrival to the first charging station. The reservation request may also comprise a preferred payment method and a preferred charging time.

In an example, the user inputs a destination, a preferred driving habit, and a charging preference via the infotainment system and the system plans a shortest driving route based on the information provided by the user. The system then analyzes data on road condition, real-time traffic data and historical traffic of the shortest driving route to estimate the rate of power consumption in the shortest driving route estimated by the system based on a length of the shortest driving route, the preferred driving habit, and the road condition. The system then updates the shortest driving route to a driving route comprising a charging station that is provided by the system based on rate of power consumption. The system checks the availability of charging stations and based on the availability of the charging station, sends a reservation request with an expected arrival time, a charging preference, and a charging type.

FIG. 9 illustrates a flow diagram for a computer-implemented method 900 for updating a route plan, according to one embodiment. The system continuously monitors the driving habit, the preferred driving mode, and the road condition during the trip. If there is a change in any of the driving habits, the preferred driving mode and the road condition that is affecting the rate of power consumption of the vehicle, the system updates the driving route to include a charging station B that the vehicle can reach before the battery's charge level reaches a set threshold.

At 902, the computer-implemented method 900 can comprise receiving a first information comprising a destination, a preferred driving habit, and a charging preference from a driver via an infotainment system or an external device. The external device can be a handheld device. The non-limiting examples of the external device are a laptop, a mobile phone, a tablet, and a rear-seat user display. The preferred driving habit comprises a speed preference, a route preference, a preference for an amount of manual driving operation, a preference for an amount of automatic driving operation, and a preferred driving mode. The preferred driving mode can be one of an economy mode, a comfort mode, a sport mode, a race mode, and an Off-road drive mode. The charging preference comprises one of Level 1 charging, Level 2 charging, and Level 3 charging. The charging station is selected based on the charging preference.

At 904, the method 900 can further comprise determining a shortest driving route from a current position to the destination based on the first information. The planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

At 906, the method 900 can further comprise receiving a second information on road condition for the shortest driving route by the route planning system. The second information on road condition is received via at least one of a navigation system, the vehicle, and the driver.

At 908, the method 900 can further comprise estimating a rate of power consumption in the shortest driving route based on a length of the shortest driving route, the preferred driving habit, and the road condition, by the route planning system. The route planning system also considers the energy that is required at the wheels to propel the vehicle, the energy losses along the powertrain, and the energy that is required for the operation of the auxiliary devices for estimating the rate of power consumption.

At 910, the method 900 can further comprise updating the shortest driving route to a driving route comprising a first charging station based on the charging preference, the rate of power consumption, and an availability of the first charging station, by the route planning system. The driving route is an optimal planned route based on an estimated wait time and an estimated charging time of the vehicle at the first charging station. The estimated charging time is based on an estimated charge level at an estimated time of arrival at the charging station.

At 912, the method 900 can further comprise sending a reservation request for charging and an estimated time of arrival to the first charging station.

At 914, the method 900 can further comprise monitoring of driving habit and driving preference by the system.

At 916, the method 900 can further comprise estimating a change in the rate of power consumption based on the change in the driving habit and driving preference.

At 918, the method 900 can further comprise determining a time interval within which a state of charge of the battery pack will reach a set threshold estimated.

At 920, the method 900 can further comprise updating the shortest driving route to a driving route comprising a second charging station based on estimated time interval within which the vehicle may reach the second charging station.

FIG. 10 illustrates a flow diagram for a computer-implemented method 1000 for updating a planned route to select and reserve a second charging station by the route planning system, according to one embodiment.

At 1002, the computer-implemented method 1000 comprise receiving a first information comprising a destination, a preferred driving habit, and a charging preference from a driver. The first information may be received via an infotainment system or an external device. The external device can be a handheld device. The non-limiting examples of the external device are a laptop, a mobile phone, a tablet, and a rear-seat user display. The preferred driving habit comprises a speed preference, a route preference, a preference for an amount of manual driving operation, a preference for an amount of automatic driving operation, and a preferred driving mode. The preferred driving mode can be one of an economy mode, a comfort mode, a sport mode, a race mode, and an Off-road drive mode. The charging preference comprises one of Level 1 charging, Level 2 charging, and Level 3 charging. The charging station is selected based on the charging preference.

At 1004, the method 1000 can further comprise determining a shortest driving route from a current position to the destination based on the first information. The planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

At 1006, the method 1000 can further comprise receiving a second information on road condition, real-time traffic data, and historical traffic data analyzed by the system, for the shortest driving route. The second information on road condition is received via at least one of a navigation system, the vehicle, and the driver.

At 1008, the method 1000 can further comprise estimating a rate of power consumption in the shortest driving route based on a length of the shortest driving route, the preferred driving habit, and the road condition. The route planning system also considers the energy that is required at the wheels to propel the vehicle, the energy losses along the powertrain, and the energy that is required for the operation of the auxiliary devices for estimating the rate of power consumption.

At 1010, the method 1000 can further comprise updating the shortest driving route to a driving route comprising a first charging station based on the charging preference, the rate of power consumption, and an availability of the first charging station, by the route planning system. The driving route is an optimal planned route based on an estimated wait time and an estimated charging time of the vehicle at the first charging station. The estimated charging time is based on an estimated charge level at an estimated time of arrival at the charging station.

At 1012, the method 1000 can further comprise sending a reservation request for charging and an estimated time of arrival to the first charging station.

At 1014, the method 1000 can further comprise monitoring of a change in driving habit and driving preference by the system.

At 1016, the method 1000 can further comprise estimating a change in the rate of power consumption based on the change in the driving habit and driving preference.

At 1018, the method 1000 can further comprise determining a time interval within which a state of charge of the battery pack will reach a set threshold estimated.

At 1020, the method 1000 can further comprise updating the shortest driving route to a driving route comprising a second charging station based on estimated time interval within which the vehicle may reach the second charging station.

At 1022, the method 1000 can further comprises sending a reservation request for charging and an estimated time of arrival to the second charging station.

In an example, the user inputs a destination, a preferred driving habit, and a charging preference via the infotainment system, and the system plans a shortest driving route based on the information provided by the user. The system then analyzes data on road condition, real-time traffic data and historical traffic of the shortest driving route to estimate the rate of power consumption in the shortest driving route estimated by the system based on a length of the shortest driving route, the preferred driving habit, and the road condition. The system then updates the shortest driving route to a driving route comprising a charging station that is provided by the system based on rate of power consumption. The system checks the availability of the charging station A, and based on the availability of the charging station, sends a reservation request with an expected arrival time, a charging preference, and a charging type. The system continuously monitors the driving habit, the preferred driving mode, and the road condition. If there is a change in any of the driving habits, the preferred driving mode and the road condition that is affecting the rate of power consumption of the vehicle, the system updates the driving route to include a charging station B where the vehicle can reach before the battery's charge level reaches a set threshold. The system checks the availability of the charging station B and based on the availability of the charging station B, sends a reservation request with an expected arrival time, a charging preference, and a charging type. The system may also transmit a cancellation request for the reservation at charging station A.

In an embodiment, the system is further configured to determine that the battery should be charged to an upper state of charge limit at the first charging station and the second charging station when cost of electrical energy at the first charging station is the same as and less than respectively the cost of electrical energy at a third charging station. In another embodiment, the system is further configured to determine that the battery should be charged at the first charging station and the second charging station with sufficient electrical energy to reach the third charging station, plus a margin of electrical energy, when the cost of electrical energy at the first charging station and second charging station is greater than the cost of electrical energy at the third charging station. In another embodiment, the system is further configured to determine that the battery should not be charged at the first charging station when the battery has a sufficient state of charge to power the vehicle to the second charging station from a current location and the cost of electrical energy is less at the second destination than at the first destination.

Figure 11B:
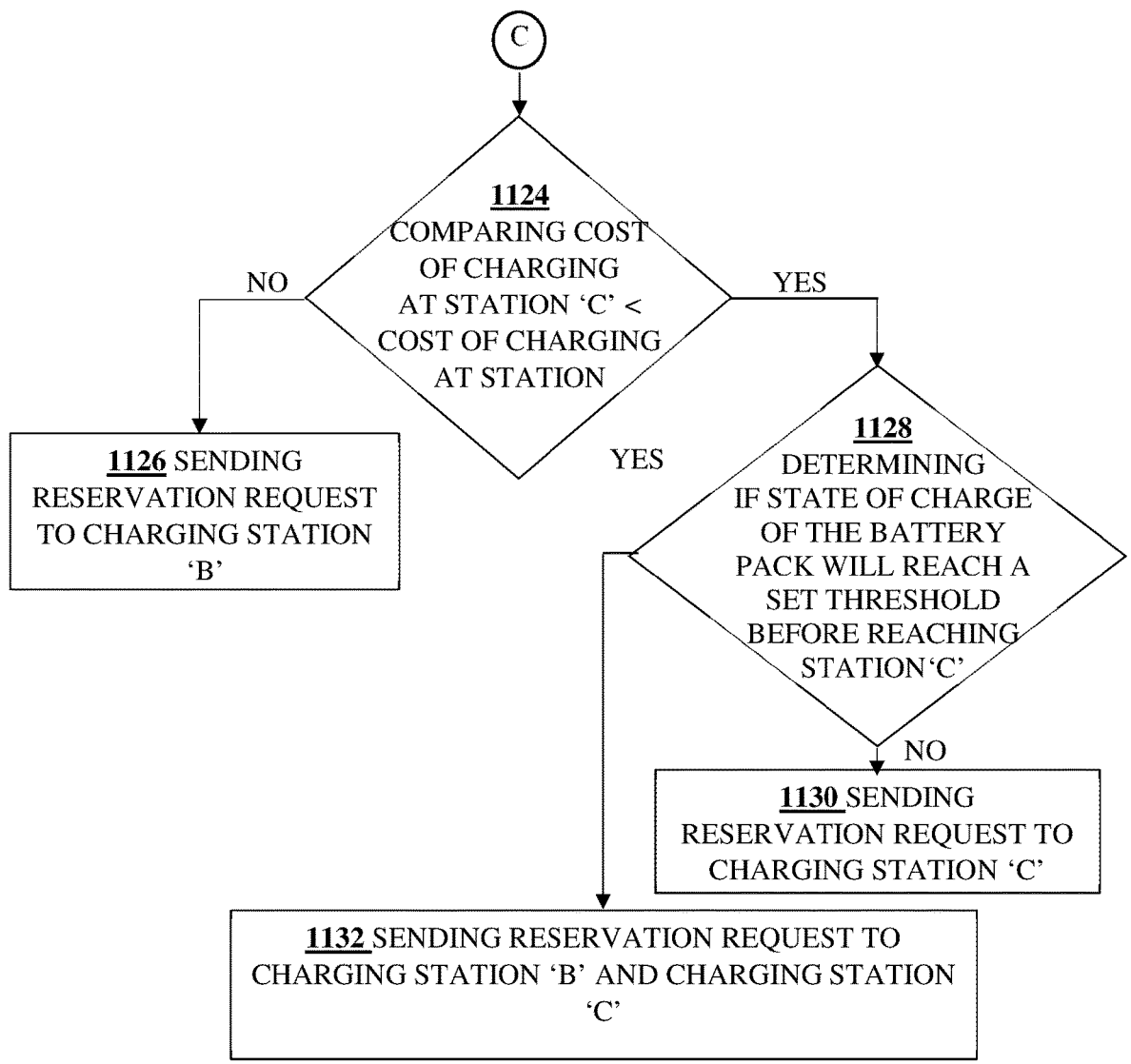

FIG. 11A and FIG. 11B illustrates a flow diagram for a computer-implemented method 1100 for a selection of a route comprising a lower cost charging station, according to one embodiment. In case there is availability of two charging stations, one of which is nearer but costlier and another a little further but cheaper, the system uses a rule-based analysis for charge planning and a route planning accordingly.

At 1102, the computer-implemented method 1100 can comprise receiving a first information comprising a destination, a preferred driving habit, and a charging preference from a driver. The first information may be received via an infotainment system or an external device. The external device can be a handheld device. The non-limiting examples of the external device are a laptop, a mobile phone, a tablet, and a rear-seat user display. The preferred driving habit comprises a speed preference, a route preference, a preference for an amount of manual driving operation, a preference for an amount of automatic driving operation, and a preferred driving mode. The preferred driving mode can be one of an economy mode, a comfort mode, a sport mode, a race mode, and an Off-road drive mode. The charging preference comprises one of Level 1 charging, Level 2 charging, and Level 3 charging. The system selects the charging station based on the charging preference.

At 1104, the method 1100 can further comprise determining a shortest driving route from a current position to the destination based on the first information. The planning of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

At 1106, the method 1100 can further comprise receiving a second information on road condition, real-time traffic data, and historical traffic data analyzed by the system, for the shortest driving route. The system receives the second information on road condition via at least one of a navigation system, the vehicle, and the driver.

At 1108, the method 1100 can further comprise estimating a rate of power consumption in the shortest driving route based on a length of the shortest driving route, the preferred driving habit, and the road condition. The route planning system also considers the energy that is required by the vehicle at the wheels to propel the vehicle, the energy losses along the powertrain, and the energy that is required for the operation of the auxiliary devices for estimating the rate of power consumption.

At 1110, the method 1100 can further comprise updating the shortest driving route to a driving route comprising a first charging station based on the charging preference, the rate of power consumption, and an availability of the first charging station, by the route planning system. The driving route is an optimal planned route based on an estimated wait time and an estimated charging time of the vehicle at the first charging station. The estimated charging time is based on an estimated charge level at an estimated time of arrival at the charging station.

At 1112, the method 1100 can further comprise sending a reservation request for charging and an estimated time of arrival to the first charging station.

At 1114, the method 1100 can further comprise monitoring of a change in driving habit and driving preference by the system.

At 1116, the method 1100 can further comprise estimating a change in the rate of power consumption based on the change in the driving habit and driving preference.

At 1118, the method 1100 can further comprise determining a time interval within which a state of charge of the battery pack will reach a set threshold estimated.

At 1120, the method 1100 can further comprise updating the shortest driving route to a driving route comprising a second charging station based on estimated time interval within which the vehicle may reach the second charging station.

At 1122, the method 1100 can further comprise detecting a third charging station near to the second charging.

At 1124, the method 1100 can further comprise comparing the cost of charging at the second station and the third charging station.

At 1126, the method 1100 can further comprise sending a reservation request to the second charging station if the cost of charging is lower at the second charging station compared to the third charging station.

At 1128, the method 1100 can further comprises determining if the state of charge of the battery pack will reach a set threshold before reaching the third charging station.

At 1130, the method 1100 can further comprise sending a reservation request to the third charging station if the state of charge of the battery pack does not reach a set threshold.

At 1132, the method 1100 can further comprise sending a reservation request to the second charging station and the third charging station if the state of charge of the battery pack reaches a set threshold. The method also comprises sending an estimated charging time for charging the battery pack at the two charging stations. The battery pack can be charged to the set threshold at the third charging station and fully charged at the second charging station.

In an embodiment, the system checks if the cost of charging at a charging station C is less than the cost of charging at charging station B. if the answer is yes, the system further checks whether the vehicle charge will reach a set threshold before reaching to charging station C. If answer to this question is yes, then the system plans a charging schedule for partial charging at the charging station B and a charging schedule for full charging at the charging station C by sending a reservation request to both the charging stations. In another example, if the cost of charging at a charging station C is less than the cost of charging at charging station B, and the charging stations B and C are in close proximity, the system checks whether the vehicle charge will reach a set threshold before reaching to charging station C without stopping nor charging at Charging Station B. If answer to this question is no, then the system plans a charging schedule for full charging at the charging station C including considering the time interval to reach charging station C for scheduling or reservation. In this example, the system may maintain the reservation at charging station B in case the vehicle reaches a set threshold and is closer to charging station B than to charging station C. In another example, if the cost of charging at a charging station C is greater than the cost of charging at charging station B, the system plans a charging schedule for full charging at the charging station B.

In an embodiment the system is configured to facilitate recommendation based on the circumstances encountered during the trip. In some embodiments, the evaluation and selection of particular routes of travel are executed by one or more specifically programmed computer machines located in the vehicle with artificial intelligence, battery energy management, and navigation control. The system comprises an artificial intelligence platform that collects the real time data and provides recommendations based on multiple analyses.

The multiple analyses involve the use of fuzzy logic calculations for battery energy management and navigation route control. Such fuzzy logic calculations comprise defined fuzzy sets with possible overlapping parameter ranges with decisions based on calculation of degrees of membership in defined fuzzy sets for particular considered route evaluation parameters. Defuzzification of multiple fuzzy logic degrees of memberships results in crisp numerical route selection indices for particular routes considered. The system may select a particular route based on comparison to these derived crisp numerical route selection indices.

In an embodiment, the artificial intelligence module assists intelligent charging planning and reservation. The artificial intelligence module is primarily built and implemented in a cloud platform (which may be referred to as a vehicle manufacturer cloud platform). The vehicle manufacturer cloud platform can communicate with the user. Specifically, the vehicle manufacturer cloud platform is capable of communicating via a network to send and receive information to and from the user (via the smartphone and/or the infotainment system of the vehicle). In this way, the artificial intelligence module can receive various vehicle-side information including vehicle state information related to the vehicle, such as a vehicle driving state, a remaining driving range, a vehicle battery remaining energy amount, a current vehicle power consumption speed, a vehicle cruising distance, and user instructions (including charging schedule information), and the like.

The artificial intelligence module can also send various information regarding suggestions for route planning and the like to a smartphone and/or the vehicle. The artificial intelligence module may provide recommendations as output from the artificial intelligence module on an output interface (e.g., a display screen) of the smartphone and/or the vehicle's infotainment system and may also be prompted to the user by sound, or the like. For example, the system may provide navigation information as recommendation via the artificial intelligence module.

In an embodiment, the artificial intelligence module is configured to provide a recommendation for changing the preferred driving habit if the road condition is not good so that the battery is still within a threshold charge level before reaching a charging station. In another embodiment, artificial intelligence module that is configured to provide a recommendation for changing the preferred driving habit if the road condition is not good so that the battery is at a threshold charge level before reaching a charging station. In another embodiment, the artificial intelligence module is configured to provide a recommendation for changing the preferred driving habit if power consumption by auxiliary devices is estimated to go beyond a set threshold so that the battery is at a threshold charge level before reaching a charging station.

In an embodiment, the artificial intelligence module is configured to provide a recommendation for changing the preferred driving habit if power consumption by auxiliary devices is estimated to go beyond a set threshold before reaching a charging station.

Figure 12:
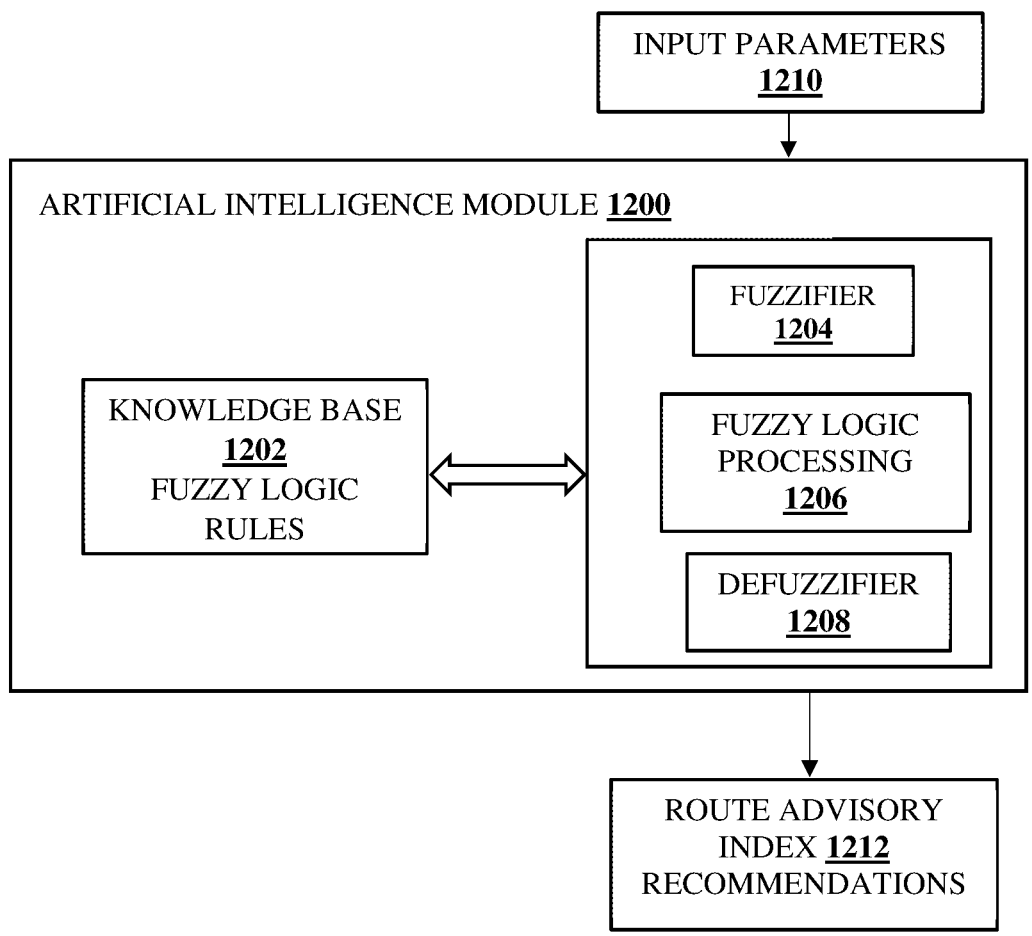
FIG. 12 is a block diagram for an artificial intelligence module for route planning to maintain efficient charge state, according to one or more embodiments.

FIG. 12 is a block diagram of an artificial intelligence module of the system for route planning to maintain efficient charge state, according to one or more embodiments. The artificial intelligence module 1200, takes multiple input parameters 1210 via the route planning database and uses fuzzy logic rules to provide recommendations using multiple operations. These operations of a fuzzy logic inference engine include access to the artificial intelligence module knowledge base 1202 which may include the fuzzy logic rules. The fuzzy logic operations include the fuzzifier (1204) used to establish degree of memberships (DOMs). The outputs of the fuzzifier (1204) are fed to the fuzzy logic processing element (1206). The defuzzifier (1208) provides crisp numerical outputs for the route advisory index (1212) to the route planning system.

In an example, the artificial intelligence platform provides recommendations of a particular route of travel based at least in part on comparisons of results from individual route evaluations of the potential routes of travel based on the received information. In another example, the system may recommend a change in the driving habit so that the battery is within the threshold charge level before reaching the charging station. In another example, the system may recommend a change in a driving habit if auxiliary devices are consuming more power than planned. In another example, the system may notify a charging station nearest to the driving route.

Figure 13A:
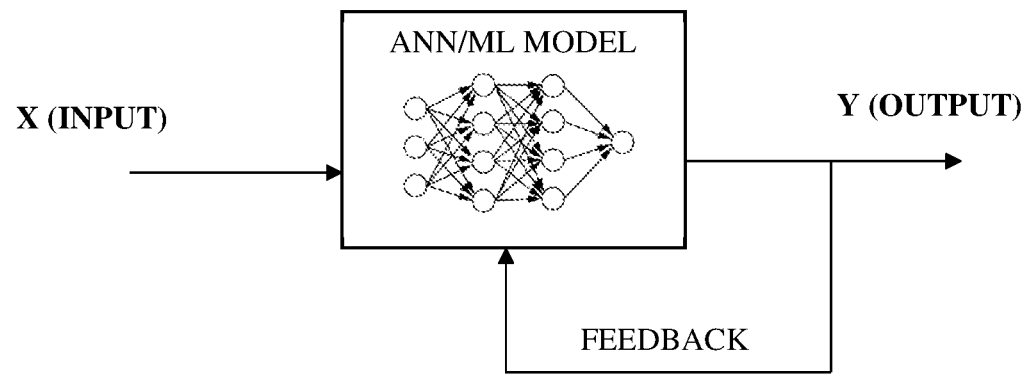
FIG. 13A shows a structure of the neural network/machine learning model with a feedback loop.

FIG. 13A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data (e.g., message received by the charging station or the charging system), make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict or detect or determine at least one of a charge consumption rate, a change in state of health of charging system, change in driving pattern, or change in driving mode, a required charging sequence to maintain a state of charge, a modified charging sequence, an update to charging time, an update to state-of-health information, amount of power etc. based on the input data. The input data may comprise one or more of a battery consumption rate, environmental factors affecting the battery performance, change in route, weather condition, road condition, traffic condition, a driving pattern, and a driving mode.

In an embodiment, ANN's may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) are adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labeled data and concepts, after a while, the models' performance may decline while adding new, unlabeled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabeled data is assimilated. A feedback loop refers to the process by which an AI model's predicted output is reused to train new versions of the model.

Initially, for training the AI/ML model, a few labeled samples comprising both positive and negative examples of the concepts (for e.g., charging rate, charging pattern, charging sequences, amount of power, etc.) are used that are meant for the model to learn. Afterward, unlabeled data can be used to test the model. By using, for example, deep learning and neural networks, the model can then make predictions on whether the desired concept/s (for e.g., charging rate, charging pattern, charging sequences, amount of power, etc.) are in unlabeled images. The machine learning algorithm gives a probability score to each image where higher scores represent a higher level of confidence in the models' predictions. Where a model gives an image a high probability score, the machine learning algorithm auto labels the images with the predicted concept. However, in the cases where the model returns a low probability score, the machine learning algorithm may send to this input a controller (may be a human moderator) which verifies and, as necessary, corrects the result. The human moderator may also assist in exceptional cases. The feedback loop feeds labeled data, auto-labeled or controller-verified, back to the model dynamically and the model may use the fed data as training data so that the system can improve its predictions in real-time and dynamically.

Figure 13B:
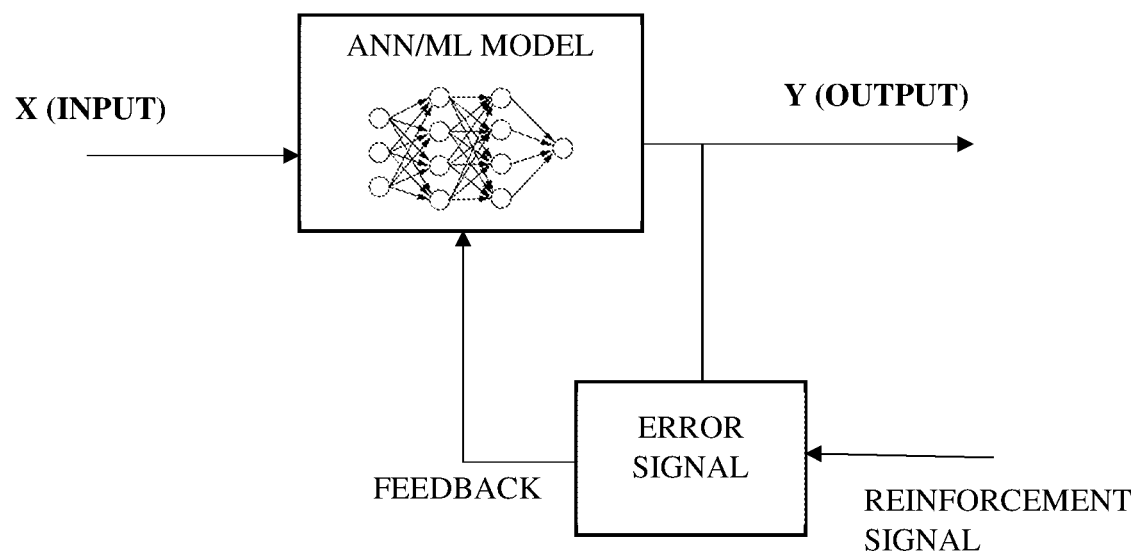
FIG. 13B shows a structure of the neural network/machine learning model with reinforcement learning.

FIG. 13B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. To reinforce training the model, the model may be fed with new data for testing, hence by feeding the model with data it has already predicted over, the training gets reinforced. If the machine learning model has a feedback loop, a reward for each true positive of the output of the system further reinforces. Feedback loops ensure that AI results do not stagnate. By incorporating a feedback loop, the model output keeps improving dynamically and over usage/time.

In an embodiment, a computer system associated with the infotainment system re-arranges icons on a graphical user interface (GUI) or display of the infotainment system based on a priority score of the content of the message. The processor tracks the messages that need to be displayed at a given time and generates a priority score, wherein the priority score is determined based on the action that needs to be taken by the user, the time available before the user input is needed, content of the message to be displayed, criticality of the user's input/action that needs to be taken, the sequence of the message or messages that need to be displayed and executed, and the safety of the overall scenario. For example, in the case of determining a charging sequence, the messages in the queue for displaying could be a charging sequence, a charging time segment, a charging level type, a modified charging sequence, amount of power, establishment of communication link etc. In all these messages that need a user's attention, a priority score is provided based on the actions that need to be taken by the user, the time available for the user to receive the displayed message and react with an action, the content of the message, criticality of the user's input/action, sequence of the messages that need to be executed, and safety of the overall scenario. Considering the above example, the message that intimates the user that a determined charging sequence may be of higher priority as compared to intimating establishment of communication link. Therefore, the charging sequence takes priority and takes such a place on the display (example, center of the display) which can grab the users' attention immediately. The computer system evaluates the priority of the messages dynamically as the situation is evolving and changes the display icons, positions, and sizes of the text or icon on the display in real time and dynamically. In an embodiment, the infotainment system displays and highlights more than one message as per the situation and the user's actions. Further, while charging, if there is an update in charging time (for example, a vehicle computer system determines a modified charging sequence, the message dynamically changes and intimates the user about the modified charging sequence.

In an aspect, a non-transitory computer readable medium is described herein. The non-transitory computer readable medium including instructions stored thereon that when processed by at least one processor causes a system associated with a vehicle to perform operations comprising receiving a first information comprising a destination, a preferred driving habit, and a charging preference via an infotainment system; determining a shortest driving route from a current position to the destination based on the first information; receiving a second information on road condition for the shortest driving route; estimating a rate of power consumption in the shortest driving route based on a length of the shortest driving route, the preferred driving habit, and the road condition; and updating the shortest driving route to a driving route comprising a first charging station based on the charging preference, the rate of power consumption, and an availability of the first charging station. In an embodiment, the instructions further comprise further comprise at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method. In an embodiment, the instructions further comprise backpropagation and feedback loops to train an AI model for optimal route planning.

Figure 14A:
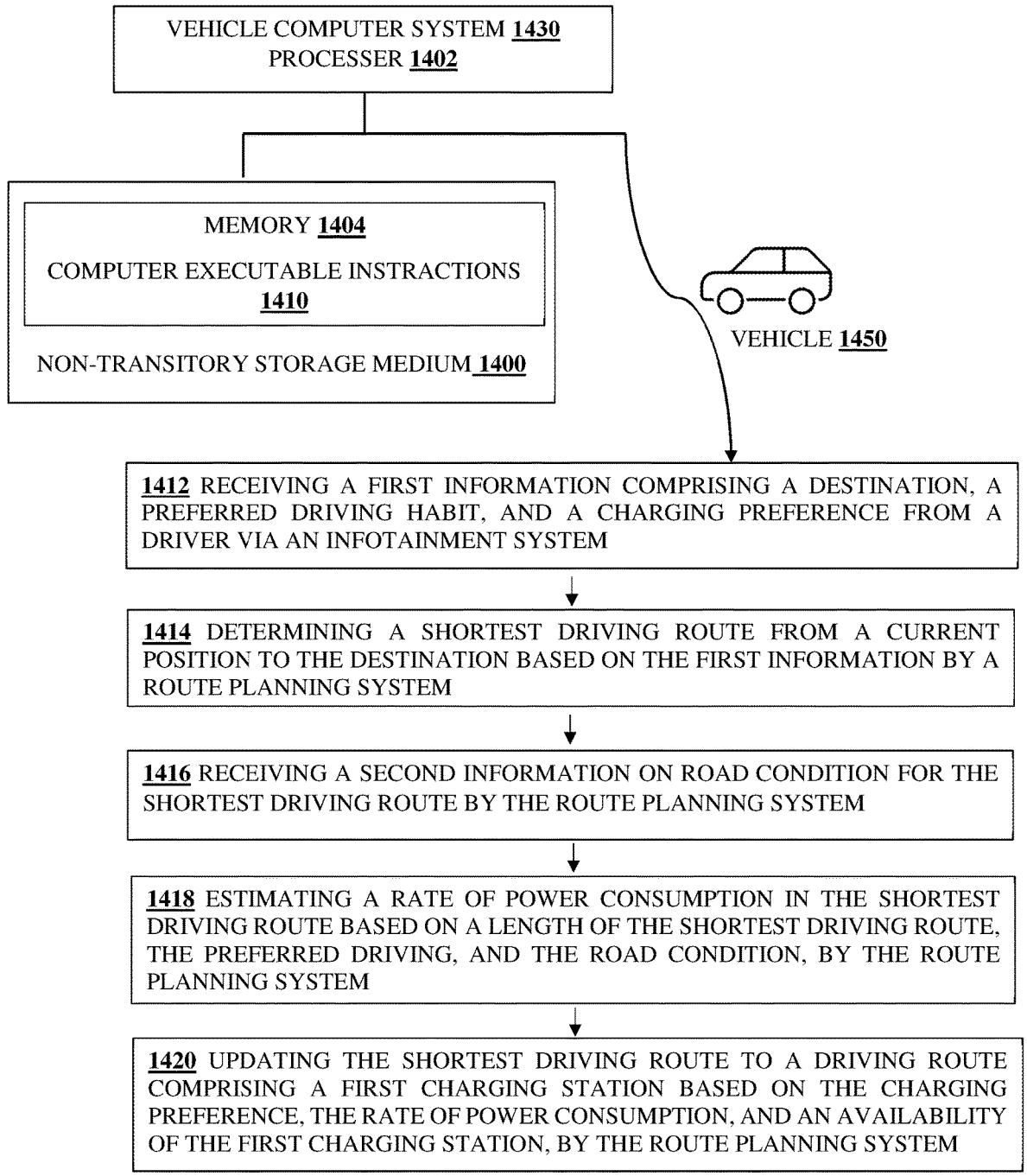
FIG. 14A illustrates a non-transitory storage medium that stores instructions to perform dynamic route planning, according to an embodiment.

FIG. 14A illustrates a non-transitory storage medium that stores instructions to perform dynamic route planning, according to an embodiment. The non-transitory storage medium 1400 comprises computer executable instructions 1410 stored thereon in a memory 1404. A processor 1402 of the vehicle computer system 1430 associated with the vehicle 1450 can process the computer executable instructions 1410 causes to perform operations comprising:

At 1412, receiving a first information comprising a destination, a preferred driving habit, and a charging preference via an infotainment system.

At 1414, determining a shortest driving route from a current position to the destination based on the first information.

At 1416, receiving a second information on road condition for the shortest driving route.

At 1418, estimating a rate of power consumption in the shortest driving route based on a length of the shortest driving route, the preferred driving habit, and the road condition.

At 1420, updating the shortest driving route to a driving route comprising a first charging station based on the charging preference, the rate of power consumption, and an availability of the first charging station.

According to one or more embodiments, the system configured to: receive a software application installation package over a computer network; and install the software application onto a computing hardware associated with a vehicle; wherein the software application comprises a set of instructions executable by a computing hardware and stored in a non-transitory storage medium that, when executed, cause the computing hardware to implement operations comprising, receiving a first information comprising a destination, a preferred driving habit, and a charging preference via an infotainment system; determining a shortest driving route from a current position to the destination based on the first information; receiving a second information on road condition for the shortest driving route; estimating a rate of power consumption in the shortest driving route based on a length of the shortest driving route, the preferred driving habit, and the road condition; and updating the shortest driving route to a driving route comprising a first charging station based on the charging preference, the rate of power consumption, and an availability of the first charging station.

Figure 14B:
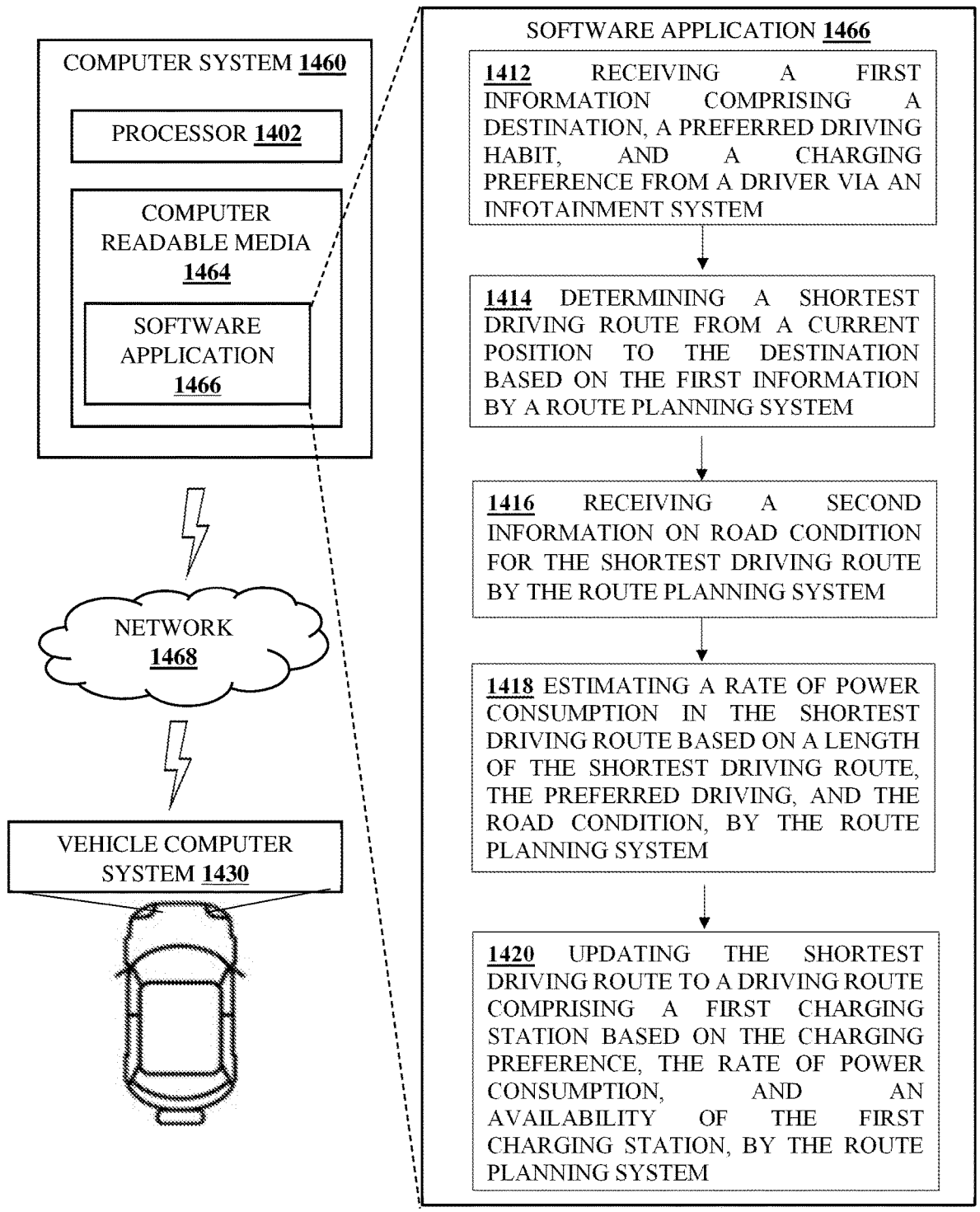
FIG. 14B illustrates a system for receiving and installing a software application package for dynamic routing by a vehicle computer system, according to an embodiment.

FIG. 14B illustrates a system for receiving and installing a software application package for dynamic routing by a vehicle computer system, according to an embodiment. The vehicle computer system 1430 receives the software application package from a computer system 1460. The computer system 1460 comprises a processor 1402 and a computer readable medium 1464. The computer readable medium 1464 further comprises a software application 1466 for dynamic routing. The software application 1466 comprises a set of instructions executable by computing hardware and stored in a non-transitory storage medium of FIG. 14A when executed, causes the computing hardware to implement operations comprising 1412-1420 as described under FIG. 14A.

Figure 15:
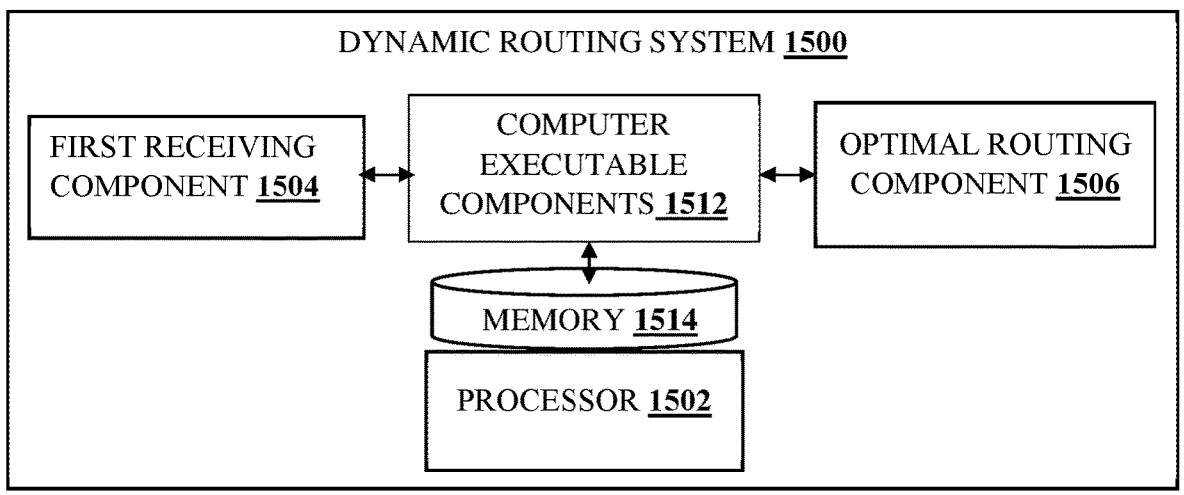
FIG. 15 illustrates a block diagram of a route planning system, according to one or more embodiments.

FIG. 15 illustrates a block diagram of a dynamic routing system 1500, according to one or more embodiments. The system comprises a memory 1514 that stores computer executable components 1512; and a processor 1502 that executes the computer executable components 1512 stored in the memory 1514, wherein the computer executable components 1512 comprise: a first receiving component 1504 that receives information of a trip comprising a destination and departure information; and an optimal routing component 1506 that determines an optimal routing based on a) current conditions; b) user preferences for charging stations; c) primary user's driving habits; d) battery's state of health; e) financial impact; and f) availability of charging stations at the time of receiving the trip information. In an embodiment, the dynamic routing system sends a reservation request for charging, to an available charging requiring a reservation. In another embodiment, the dynamic routing system continuously monitors a change in current conditions, a change in primary user's driving habits, a change in a secondary user's driving habits, a change in battery's state of health, and the availability of charging stations during the trip. In yet another embodiment, the dynamic routing system adjusts a selection of the charging stations based on the change in current conditions, the change in primary user's driving habits, the change in the secondary user's driving habits, the change in battery's state of health, and the availability of charging stations during the trip. In yet another embodiment, the dynamic routing system is configured to: establishing a first communication with an available second charging station, sending a second reservation request to the available second charging station, establishing a second communication with the available charging station adjusts the reservation. In yet another embodiment, the current condition comprises a road condition, a traffic condition, and a weather condition. In yet another embodiment, the user preferences comprise one of Level 1 Electric Vehicle Charging Stations, Level 2 Electric Vehicle Charging Stations, and Level 3 Electric Vehicle Charging Stations. In yet another embodiment, the driving habits comprise a speed preference, a route preference, a preference for an amount of manual driving operation, a preference for an amount of automatic driving operation, and a preferred driving mode. In yet another embodiment, the state of health comprises a representation of performance parameters comprising battery capacity, battery internal resistance, battery self-discharge, battery charge acceptance, battery discharge capabilities, mobility of electrolytes, and cycle-counting information. In yet another embodiment, the financial impact is an electricity price for charging at an available charging station.

Those skilled in the art may make any feasible modifications to the electric vehicle intelligent charging planning and scheduling techniques of the present application according to particular needs.

Although the present application has been described herein with reference to particular embodiments, the scope of the present application is not intended to be limited to the details shown. Various modifications may be made to these details without departing from the underlying principles of the application.

What is claimed is:

1. A system comprising:
a route planning system further comprising an infotainment system, a navigation system, a memory, and a processor, communicatively coupled to the memory, wherein the system, under power, is operable to:
receive a first information comprising a destination, a preferred driving habit, and a charging preference via the infotainment system;
determine a shortest driving route from a current position to the destination based on the first information;
receive a second information on road condition for the shortest driving route;
estimate a rate of power consumption in the shortest driving route based on a length of the shortest driving route, the preferred driving habit, and the road condition; and
update the shortest driving route to a driving route comprising a first charging station based on the charging preference, the rate of power consumption, and an availability of the first charging station.

2. The system of claim 1, wherein the system further comprises a battery management system that is operable to estimate a state of charge of a battery, a state of health of the battery, and the rate of power consumption.

3. The system of claim 2, wherein the system further comprises a location system that can provide a current location of a vehicle comprising the battery.

4. The system of claim 1, wherein the road condition comprises road surface condition, road anomalies and weather conditions.

5. The system of claim 1, wherein the driving route is further determined based on real-time traffic data and historical traffic data.

6. The system of claim 1, wherein the infotainment system is operable to facilitate a continuous communication with a user and to receive a charging station change by the user.

7. The system of claim 6, wherein the infotainment system is operable to display the driving route.

8. The system of claim 6, wherein the infotainment system receives information via an external device.

9. The system of claim 8, wherein the external device is a handheld device.

10. The system of claim 8, wherein the external device is a rear-seat user display.

11. The system of claim 8, wherein the infotainment system communicates with the external device via a companion app installed in the external device.

12. A method comprising:
receiving a first information comprising a destination, a preferred driving habit, and a charging preference from a user via an infotainment system;
determining a shortest driving route from a current position to the destination based on the first information by a route planning system;
receiving a second information on road condition for the shortest driving route by the route planning system;
estimating a rate of power consumption in the shortest driving route based on a length of the shortest driving route, the preferred driving habit, and the road condition, by the route planning system;
updating the shortest driving route to a driving route comprising a first charging station based on the charging preference, the rate of power consumption, and an availability of the first charging station, by the route planning system; and
wherein the method facilitates efficient route planning that maximizes charge of a battery of a vehicle.

13. The method of claim 12, wherein the determining of the shortest driving route and the driving route uses at least one of a Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method.

14. The method of claim 12, further comprises transmitting a first charging reservation request, a current location, and a first estimated time of arrival to the first charging station based on confirmation by the user.

15. The method of claim 12, further comprises:
monitoring a driving habit;
estimating a change in the rate of power consumption of the battery based on the change in the driving habit and the road condition;
estimating a time interval within which a state of charge will reach a set threshold; and
updating the driving route to include a second charging station where the vehicle can reach within the time interval.

16. The method of claim 15, further comprises transmitting a second charging reservation request and a second estimated time of arrival to a second available charging station based on a confirmation by the user; and
transmitting a cancellation request to the first charging station based on confirmation by the user.

17. The method of claim 16, further comprises updating the route to include a third charging station in which cost of electrical energy is less than the first charging station and the second charging station.

18. The method of claim 15, further comprises estimating a wait time and a charging time at the first charging station and the second charging station.

19. The method of claim 18, wherein the driving route is an optimal planned route based on at least one of the estimated wait time and the estimated charging time.

20. A non-transitory computer readable medium including instructions stored thereon that when processed by at least one processor causes a system associated with a vehicle to perform operations comprising:
receiving a first information comprising a destination, a preferred driving habit, and a charging preference via an infotainment system;
determining a shortest driving route from a current position to the destination based on the first information;
receiving a second information on road condition for the shortest driving route;
estimating a rate of power consumption in the shortest driving route based on a length of the shortest driving route, the preferred driving habit, and the road condition; and
updating the shortest driving route to a driving route comprising a first charging station based on the charging preference, the rate of power consumption, and an availability of the first charging station.

* * * * *